US012572521B2

(12) United States Patent
Itoh et al.

(10) Patent No.: US 12,572,521 B2
(45) Date of Patent: Mar. 10, 2026

(54) DATA ANALYSIS APPARATUS AND METHOD

(71) Applicant: KABUSHIKI KAISHA TOSHIBA, Tokyo (JP)

(72) Inventors: Takayuki Itoh, Kawasaki (JP); Wataru Watanabe, Tokyo (JP); Jumpei Ando, Yokohama (JP); Keisuke Kawauchi, Kawasaki (JP); Toshiyuki Ono, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 977 days.

(21) Appl. No.: 17/652,575

(22) Filed: Feb. 25, 2022

(65) Prior Publication Data

US 2023/0081798 A1 Mar. 16, 2023

(30) Foreign Application Priority Data

Sep. 16, 2021 (JP) ................................. 2021-151465

(51) Int. Cl.
*G06F 16/22* (2019.01)
*G05B 19/418* (2006.01)
(Continued)

(52) U.S. Cl.
CPC ....... *G06F 16/2246* (2019.01); *G05B 19/418* (2013.01); *G05B 19/41875* (2013.01);
(Continued)

(58) Field of Classification Search
CPC ............. G06F 16/2246; G06F 16/2272; G06F 16/2365; G06F 16/282; G06F 17/18;
(Continued)

(56) References Cited

U.S. PATENT DOCUMENTS

| | | | |
|---|---|---|---|
| 11,754,985 B2 * | 9/2023 | Takada | ............... G05B 13/0265 |
| | | | 700/28 |
| 2010/0174742 A1 * | 7/2010 | Shinjo | ................. G06F 16/2246 |
| | | | 707/769 |
| 2021/0134032 A1 | 5/2021 | Watanabe et al. | |

(Continued)

FOREIGN PATENT DOCUMENTS

| | | |
|---|---|---|
| JP | 2019-82865 A | 5/2019 |
| JP | 2020-77033 A | 5/2020 |
| JP | 2021-71896 A | 5/2021 |
| JP | 2022-92419 A | 6/2022 |
| WO | WO 2021/015093 A1 | 1/2021 |

OTHER PUBLICATIONS

Japanese Decision to Grant issued Sep. 17, 2024 in Japanese Patent Application No. 2021-151465 (with unedited computer-generated English translation), 5 pages.

(Continued)

*Primary Examiner* — Manuel A Rivera Vargas

(74) *Attorney, Agent, or Firm* — Oblon, McClelland, Maier & Neustadt, L.L.P.

(57) ABSTRACT

According to one embodiment, a data analysis apparatus includes processing circuitry. The processing circuitry acquires a data element group composed of a plurality of data elements, calculates, in regard to a first data element in the data element group, an index value indicative of a conditional dispersion from another data element in the data element group, extracts, based on the index value, a parent element having a high association with the first data element from the data element group, and outputs an analysis result including first information relating to the first data element and the parent element.

14 Claims, 14 Drawing Sheets

(51) Int. Cl.

| | | |
|---|---|---|
| *G06F 16/23* | (2019.01) | |
| *G06F 16/28* | (2019.01) | |
| *G06N 5/04* | (2023.01) | |
| *G06N 20/20* | (2019.01) | |

(52) U.S. Cl.
CPC ...... *G06F 16/2272* (2019.01); *G06F 16/2365* (2019.01); *G06F 16/282* (2019.01); *G06N 5/04* (2013.01); *G06N 20/20* (2019.01)

(58) Field of Classification Search
CPC ........... G05B 19/418; G05B 19/41875; G05B 2219/32185; G06N 5/04; G06N 20/20; G06N 7/01; G06N 20/00
See application file for complete search history.

(56) References Cited

U.S. PATENT DOCUMENTS

| | | | |
|---|---|---|---|
| 2021/0233004 A1* | 7/2021 | Zhang .............. | G06Q 10/06315 |
| 2022/0188307 A1 | 6/2022 | Watanabe et al. | |
| 2023/0316072 A1* | 10/2023 | Vierck .................. | G06N 3/044 |
| | | | 706/21 |

OTHER PUBLICATIONS

Japanese Office Action issued May 21, 2024 in Japanese Application 2021-151465, (with unedited computer-generated English translation), 6 pages.
Vanis, M. et al., "Employing Bayesian Networks and Conditional Probability Functions for Determining Dependences in Road Traffic Accidents Data", IEEE, 2017, 5 pages.

\* cited by examiner

1
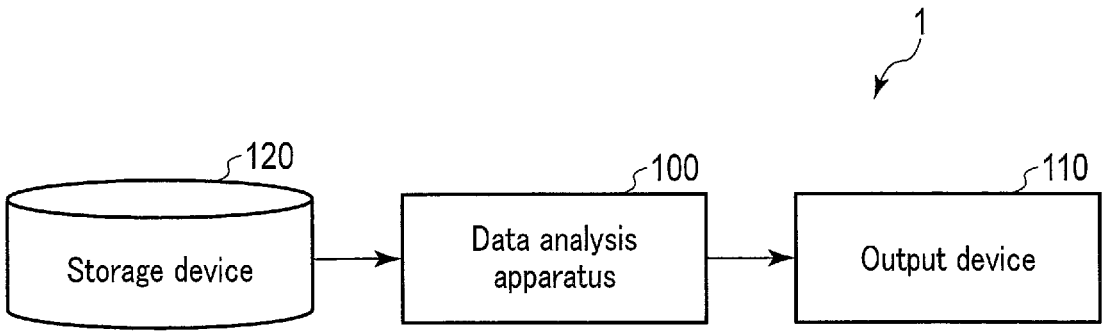
120
Storage device
100
Data analysis apparatus
110
Output device
F I G. 1

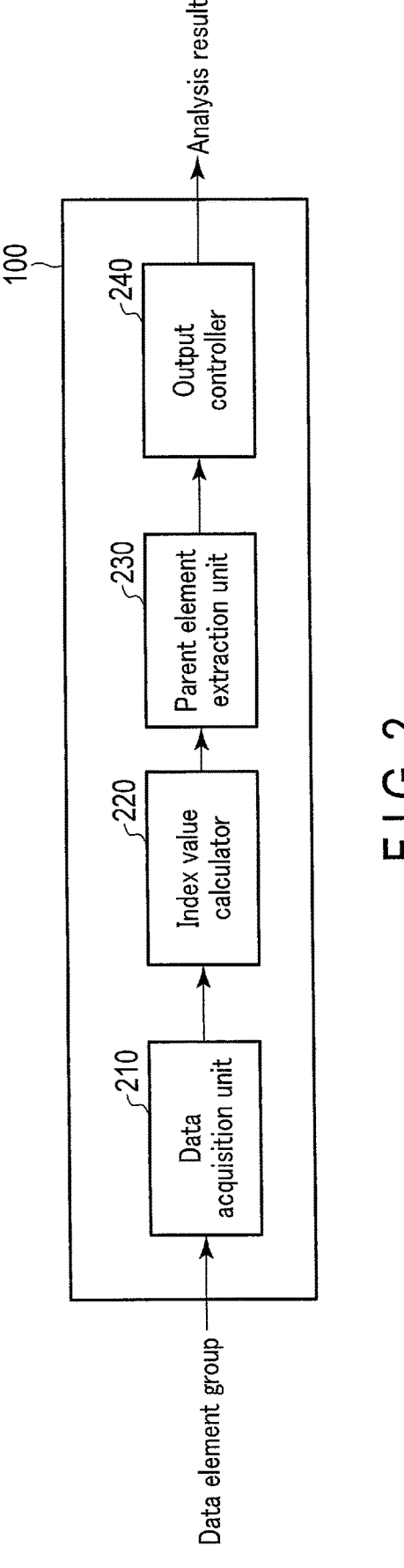
F I G. 2

300
|  | Element X1=p | Element X1=q |
|---|---|---|
| Element X2=a | 120 | 0 |
| Element X2=b | 67 | 0 |
| Element X2=c | 98 | 0 |
| Element X2=d | 0 | 198 |
| Element X2=e | 0 | 231 |
F I G. 3
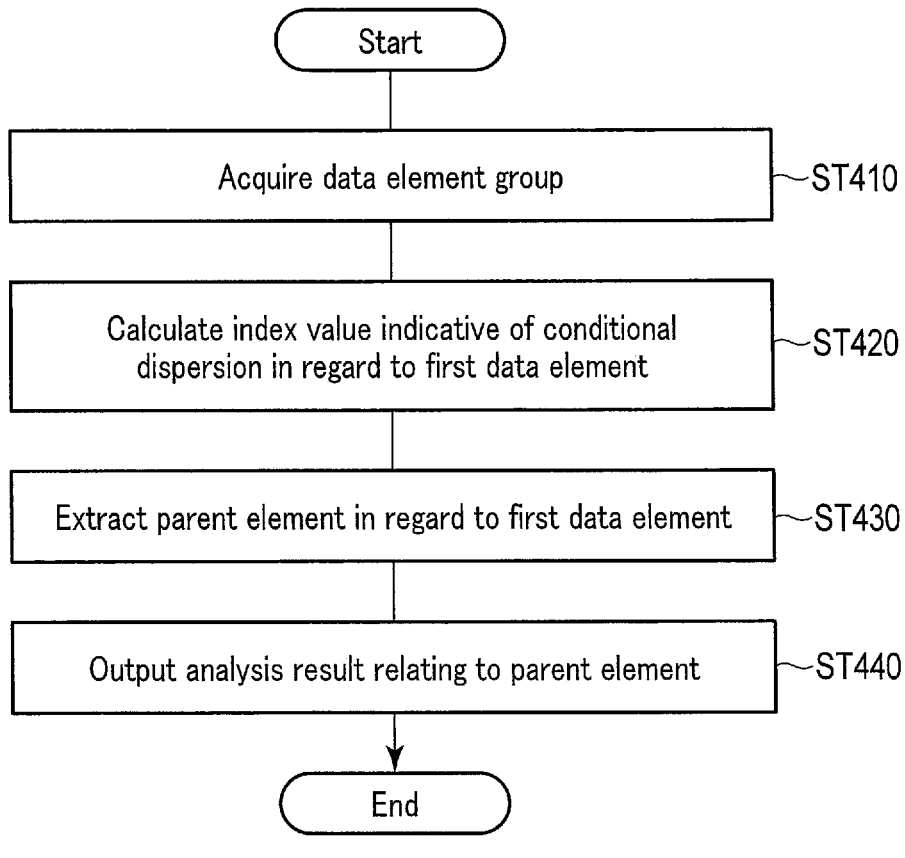
Start
Acquire data element group — ST410
Calculate index value indicative of conditional dispersion in regard to first data element — ST420
Extract parent element in regard to first data element — ST430
Output analysis result relating to parent element — ST440
End
F I G. 4

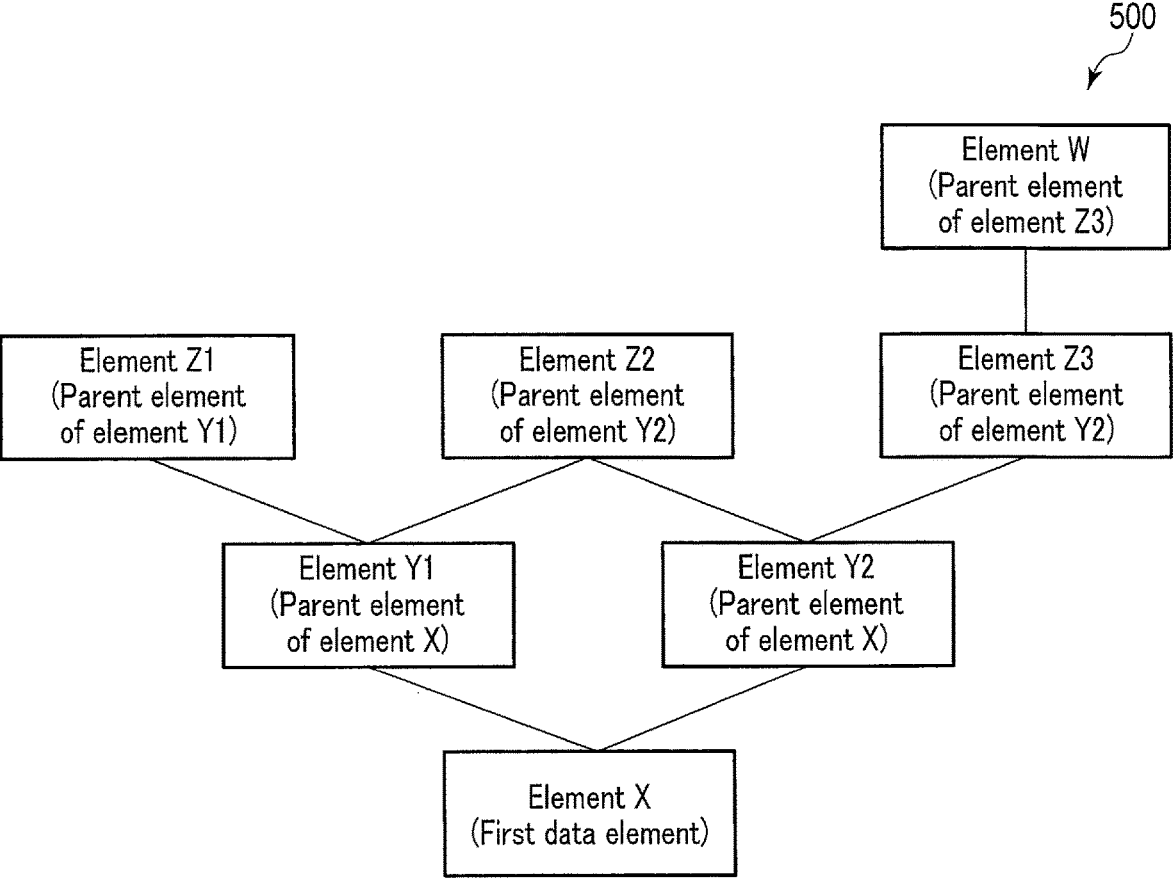
F I G. 5

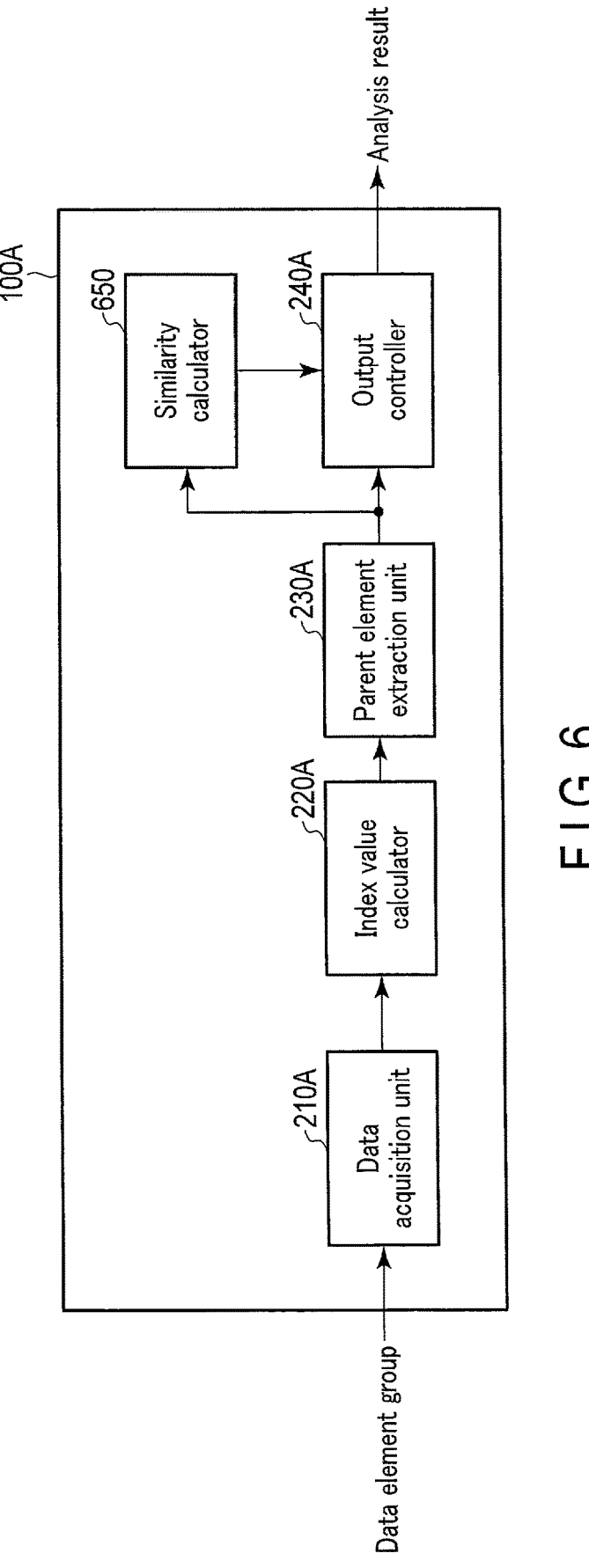
F I G. 6

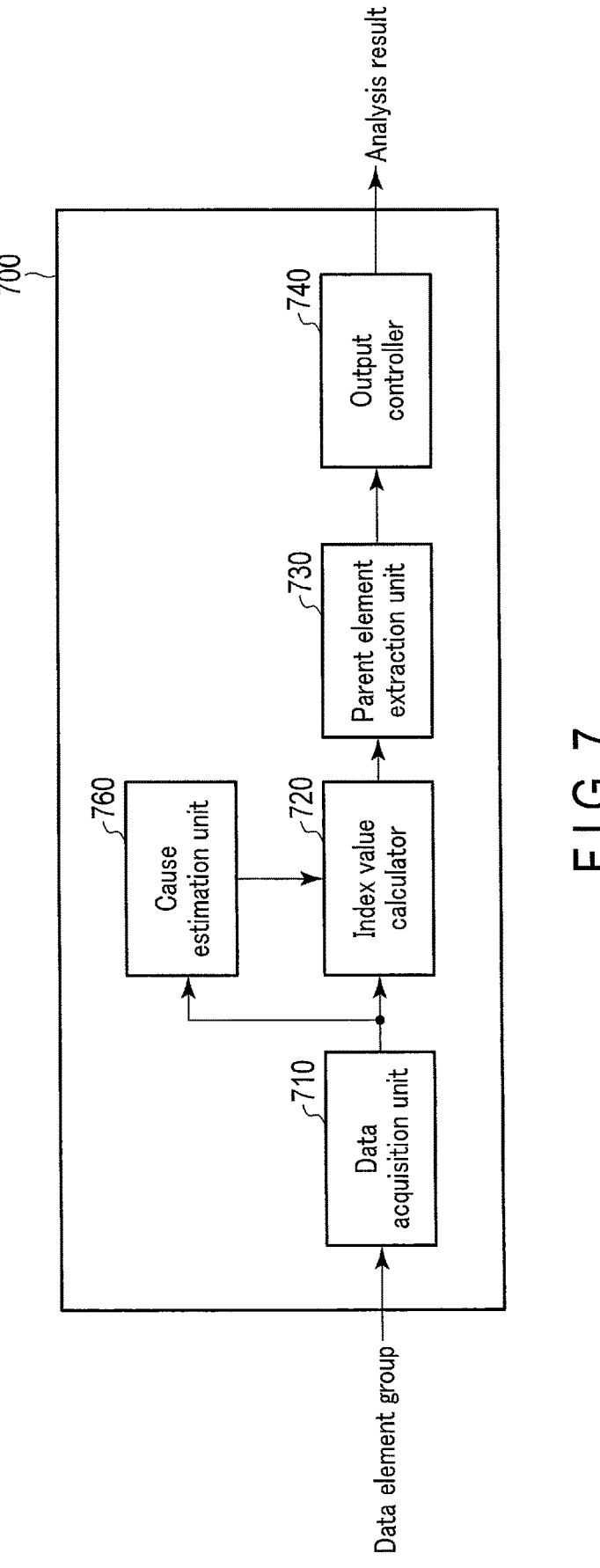
F I G. 7

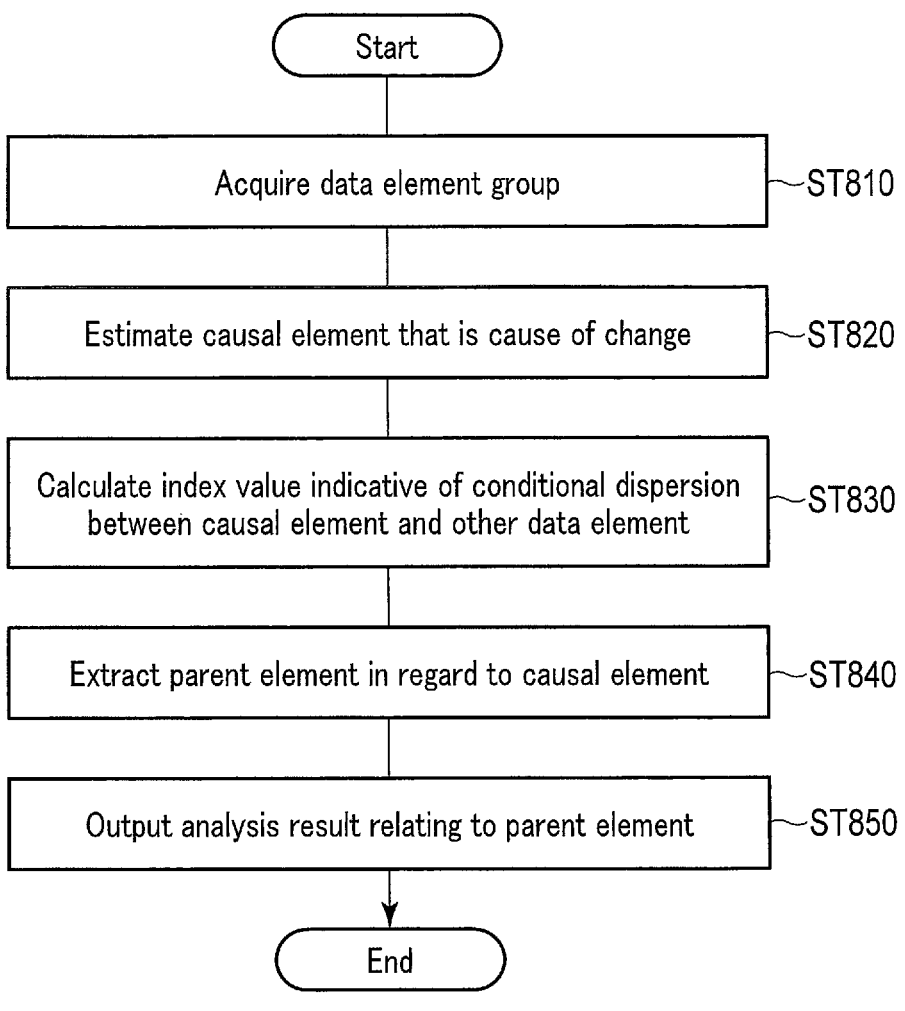
Start
Acquire data element group ⟶ ST810
Estimate causal element that is cause of change ⟶ ST820
Calculate index value indicative of conditional dispersion between causal element and other data element ⟶ ST830
Extract parent element in regard to causal element ⟶ ST840
Output analysis result relating to parent element ⟶ ST850
End
F I G. 8

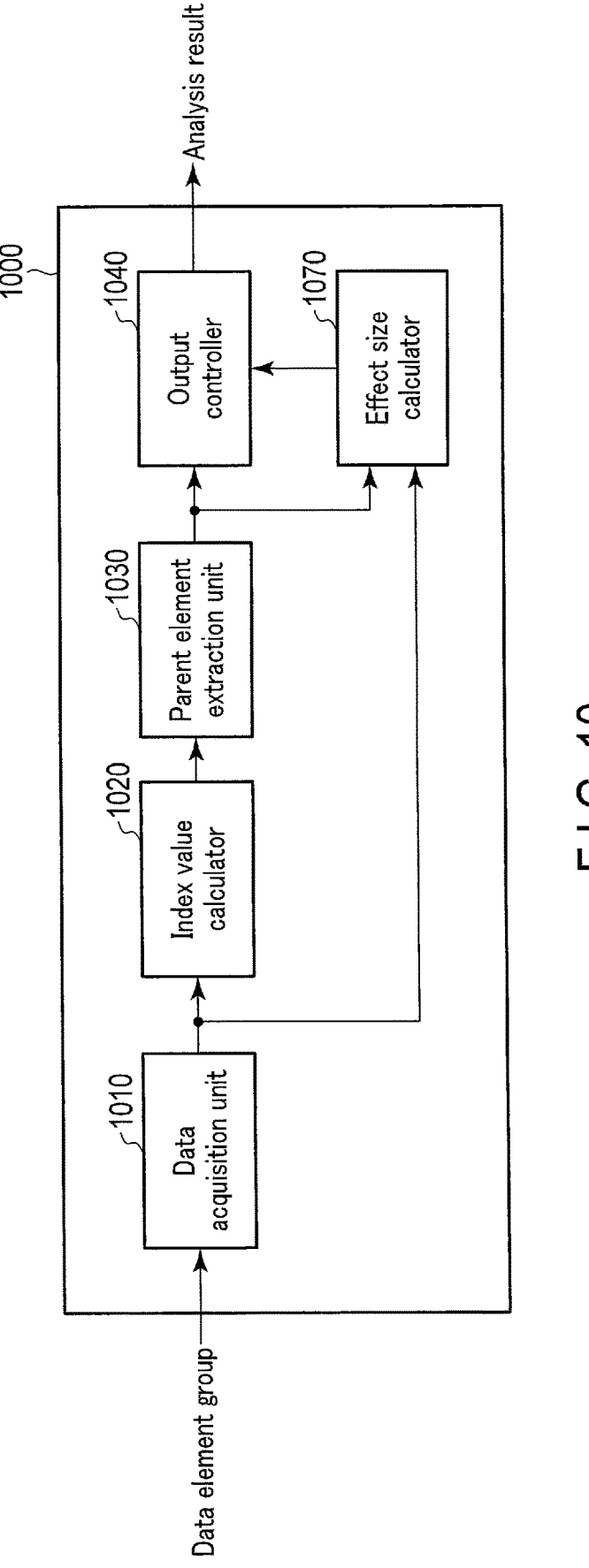
F I G. 10

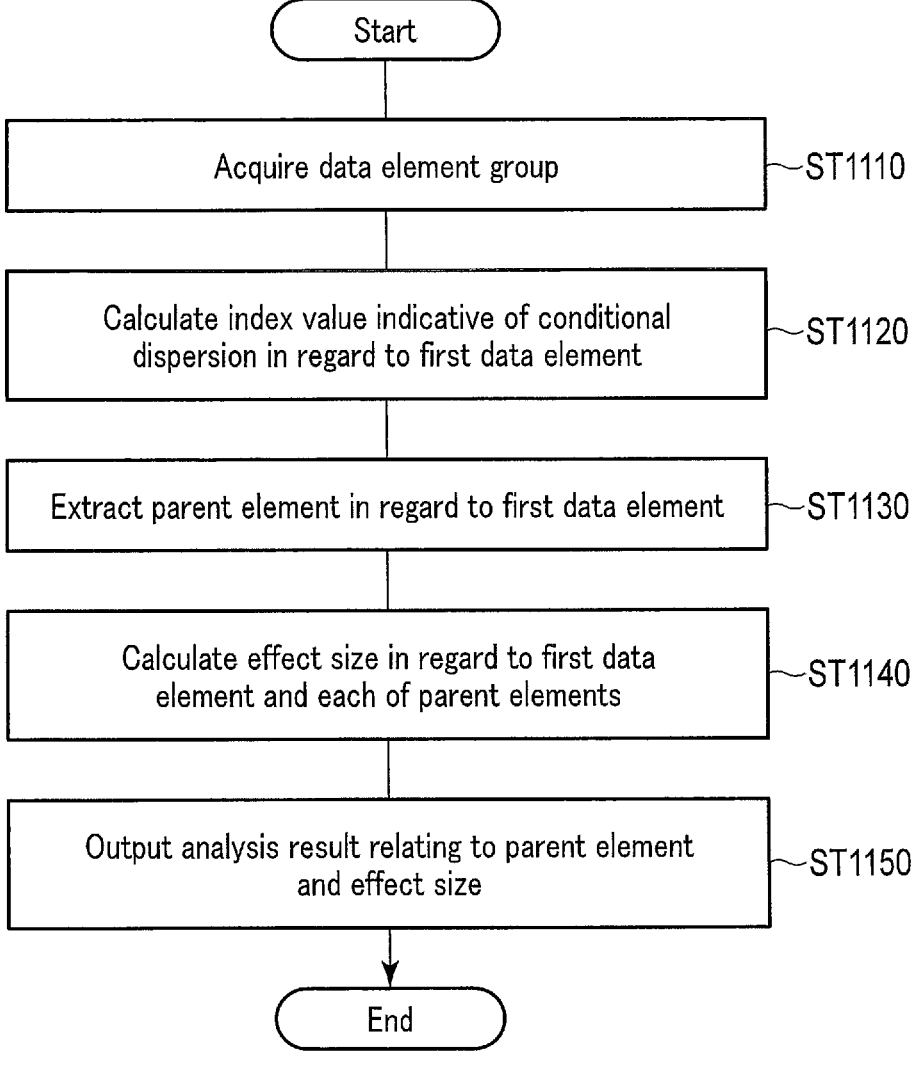
Start
Acquire data element group ─ST1110
Calculate index value indicative of conditional
dispersion in regard to first data element ─ST1120
Extract parent element in regard to first data element ─ST1130
Calculate effect size in regard to first data
element and each of parent elements ─ST1140
Output analysis result relating to parent element
and effect size ─ST1150
End
F I G. 11

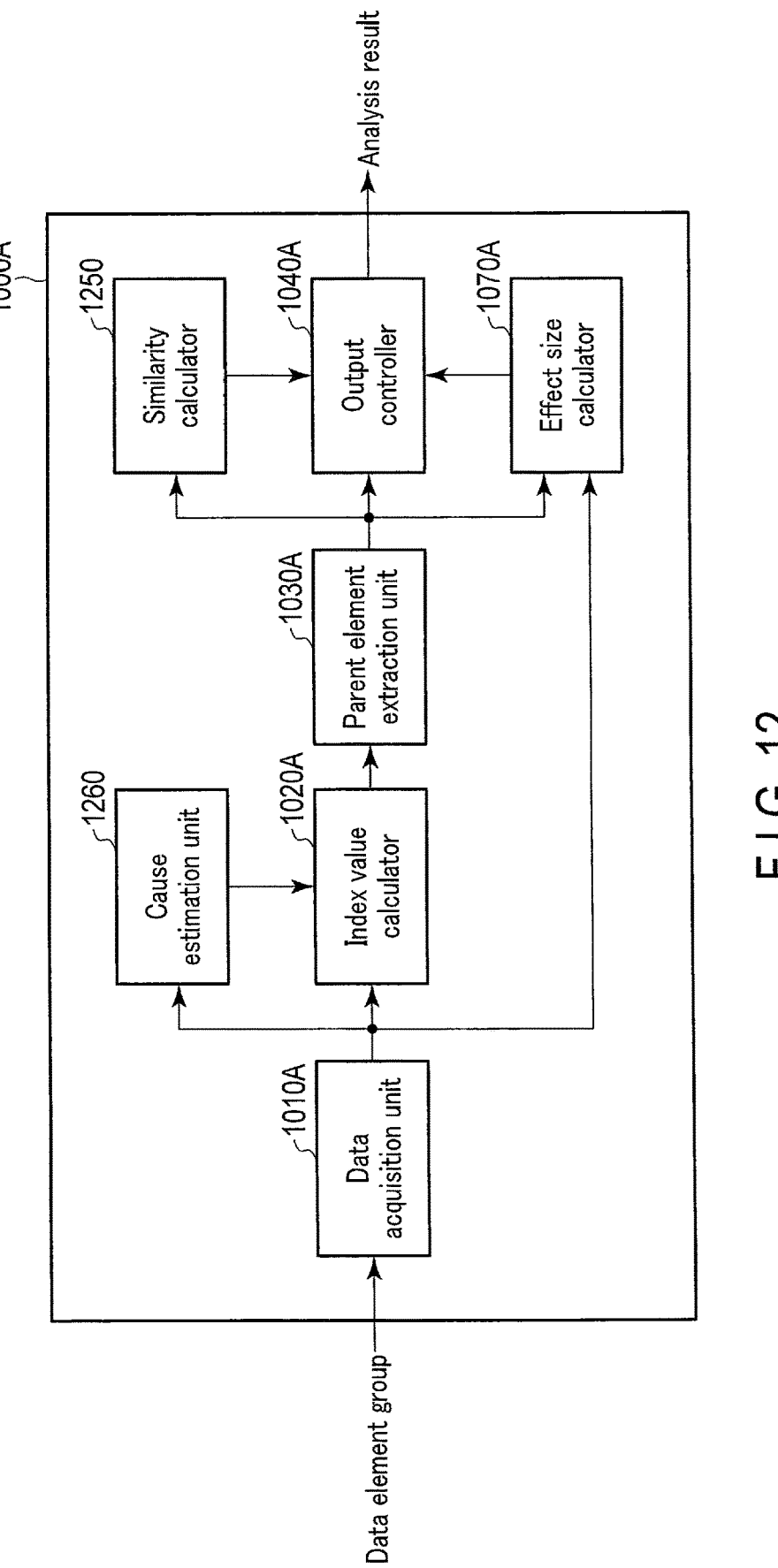
F I G. 12

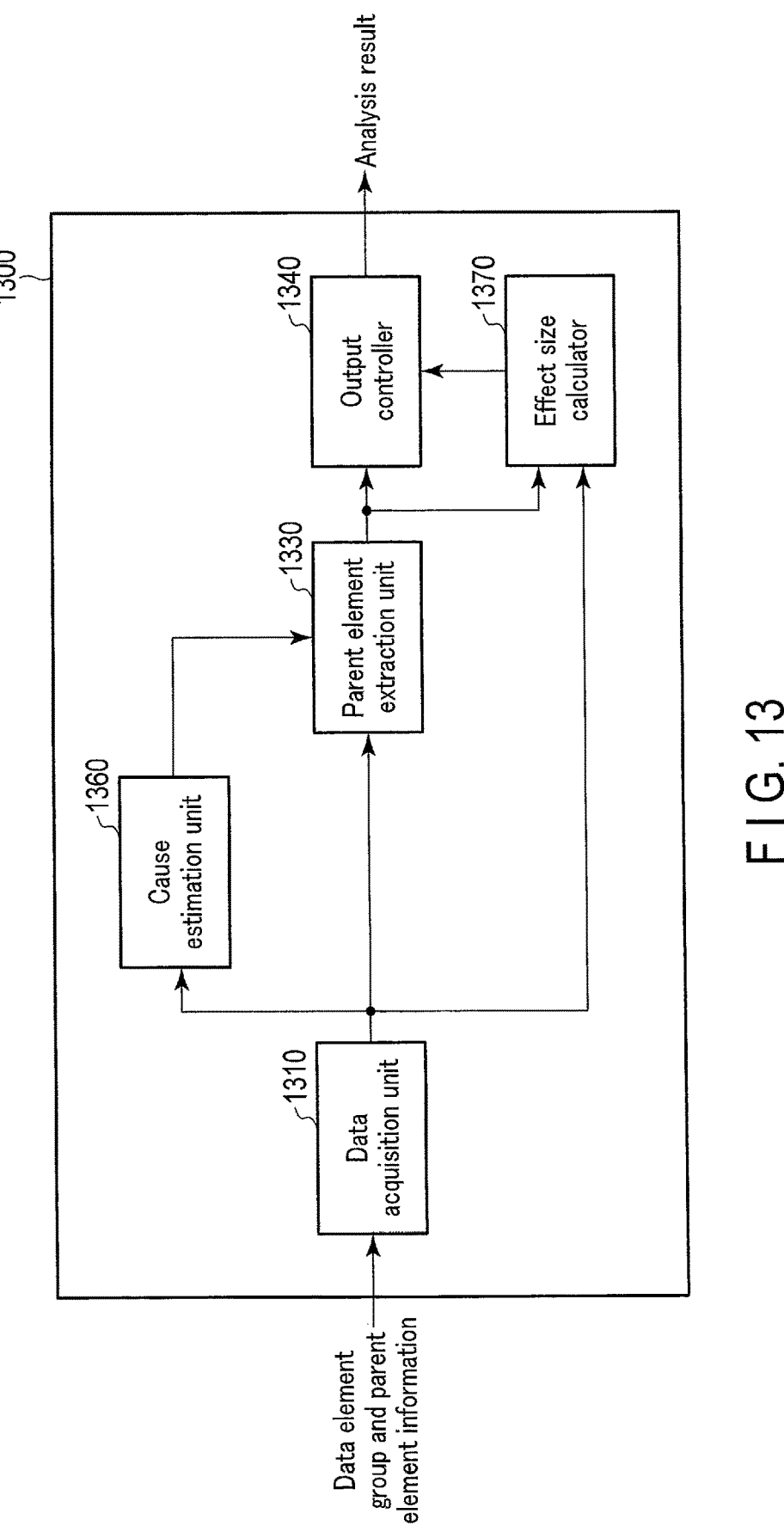
F I G. 13

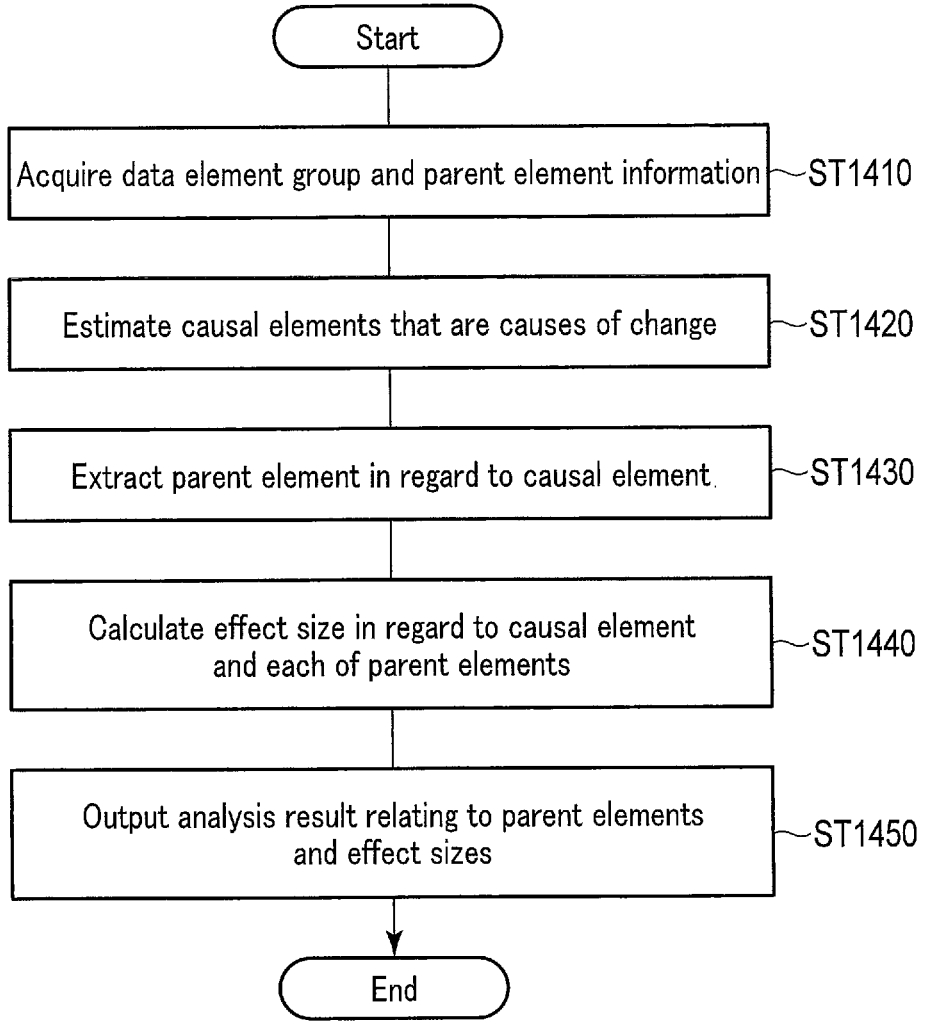
Start
Acquire data element group and parent element information ⟋ST1410
Estimate causal elements that are causes of change ⟋ST1420
Extract parent element in regard to causal element ⟋ST1430
Calculate effect size in regard to causal element
and each of parent elements ⟋ST1440
Output analysis result relating to parent elements
and effect sizes ⟋ST1450
End
F I G. 14

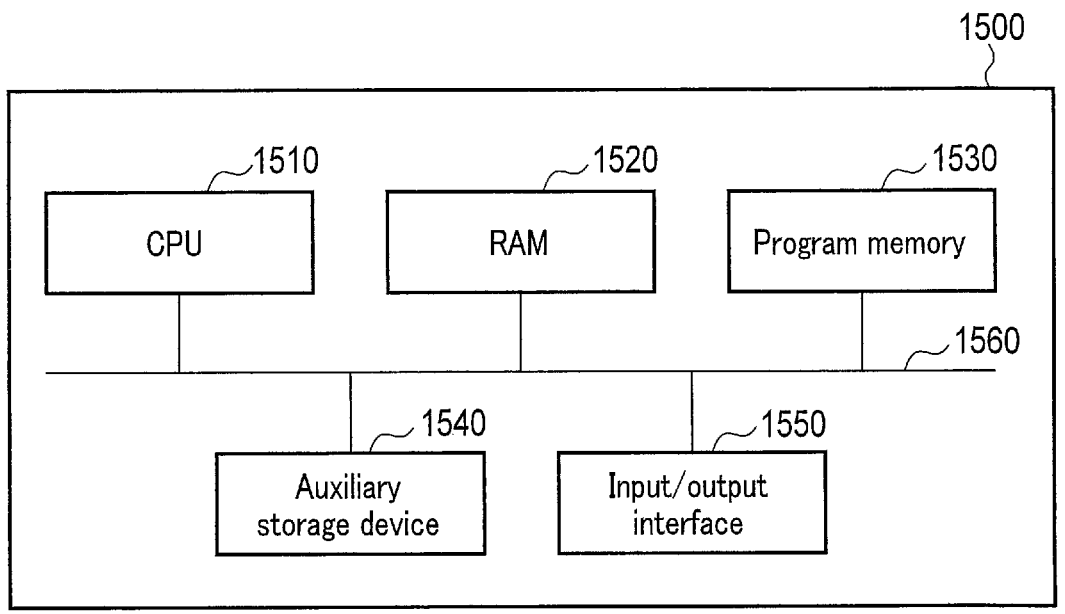
F I G. 15

DATA ANALYSIS APPARATUS AND METHOD

CROSS-REFERENCE TO RELATED APPLICATIONS

This application is based upon and claims the benefit of priority from Japanese Patent Application No. 2021-151465, filed Sep. 16, 2021, the entire contents of which are incorporated herein by reference.

FIELD

Embodiments described herein relate generally to a data analysis apparatus and method.

BACKGROUND

There is a need for searching a factor of a change, in regard to a change of given data (e.g. a numerical value, a count value or a probability value) or a change in a dispersion of the given data. For example, in the manufacturing industry, when there occurs an abnormality such as an increase in defective fraction of products or a decrease in quality index value, it is important to quickly recognize a fabrication step that is a cause of the abnormality, and to implement a remedial measure. Conventionally, there is known a method in which data, such as a characteristic value (e.g. a measurement value such as a quality index value) of each product, presence/absence of a defect, and a manufacturing condition (e.g. a manufacturing device, time of manufacture, a member that is used, and a setting of each device), is recorded, and the recorded data is analyzed, thereby detecting a change of the characteristic value or defective fraction, and searching a manufacturing condition or the like that is the cause of the change.

When a factor of a change of certain data Y is to be estimated, for example, a method is conceivable in which regression analysis is executed with one or a plurality of data elements (or data columns) X being used as explanatory variables, and the factor is estimated based on a degree of fitness of the data element X. If a data element X is a factor (correct answer) of the change, a model with good fitness is obtained. On the other hand, if the data element X is an incorrect answer, a model with poor fitness is obtained. From this, the factor of the change of the data Y can be estimated by evaluating the fitness of a regression model in regard to an arbitrary data element X.

In recent years, with the development of the Internet of Things technology, for instance, the acquisition and accumulation of various kinds of data are progressing. On the other hand, with the increase in volume of data, it will be difficult to search necessary information from enormous data. In the above-described factor search method, since the number of candidates of data elements X becomes enormous, there arises such a problem that many models with good fitness occur and it becomes difficult to determine which factor is a correct answer.

In addition, for example, when categorical data elements with a large number of levels are present, there is a tendency that a model using such data elements has good fitness to the data Y. If the number of levels is large, it becomes possible to express an effect by other correlated data, and the fitness tends to become better. As a result, data elements with a large number of levels tend to have higher ranks in factor estimation results, and, conversely, data element with a small number of levels tend to have lower ranks in the factor estimation results. As a measure to cope with this problem, in general, the score of data with a large number of levels is held down, based on a statistical method such as regularization or model selection. However, when a data element itself with a large number of levels has some effect, there is a case in which this data element still has a higher rank. In this case, if a factor, the number of levels of which is small but which has a great effect, is in a low rank, there is a problem that a major factor to the change of the data Y is overlooked.

BRIEF DESCRIPTION OF THE DRAWINGS

FIG. 1 is a block diagram exemplarily illustrating a configuration of a data analysis system including a data analysis apparatus according to a first embodiment.

FIG. 2 is a block diagram exemplarily illustrating a configuration of the data analysis apparatus of FIG. 1.

FIG. 3 is a view exemplarily illustrating a cross-tab for describing a parent-child relationship.

FIG. 4 is a flowchart exemplarily illustrating an operation of the data analysis apparatus of FIG. 2.

FIG. 5 is a view exemplarily illustrating a tree structure for describing a hierarchical parent-child relationship.

FIG. 6 is a block diagram exemplarily illustrating a configuration of a data analysis apparatus according to a modification of the first embodiment.

FIG. 7 is a block diagram exemplarily illustrating a configuration of a data analysis apparatus according to a second embodiment.

FIG. 8 is a flowchart exemplarily illustrating an operation of the data analysis apparatus of FIG. 7.

FIG. 10 is a block diagram exemplarily illustrating a configuration of a data analysis apparatus according to a third embodiment.

FIG. 11 is a flowchart exemplarily illustrating an operation of the data analysis apparatus of FIG. 10.

FIG. 12 is a block diagram exemplarily illustrating a configuration of a data analysis apparatus according to a modification of the third embodiment.

FIG. 13 is a block diagram exemplarily illustrating a configuration of a data analysis apparatus according to a fourth embodiment.

FIG. 14 is a flowchart exemplarily illustrating an operation of the data analysis apparatus of FIG. 13.

FIG. 15 is a block diagram exemplarily illustrating a hardware configuration of a computer according to an embodiment.

DETAILED DESCRIPTION

Figure 9:
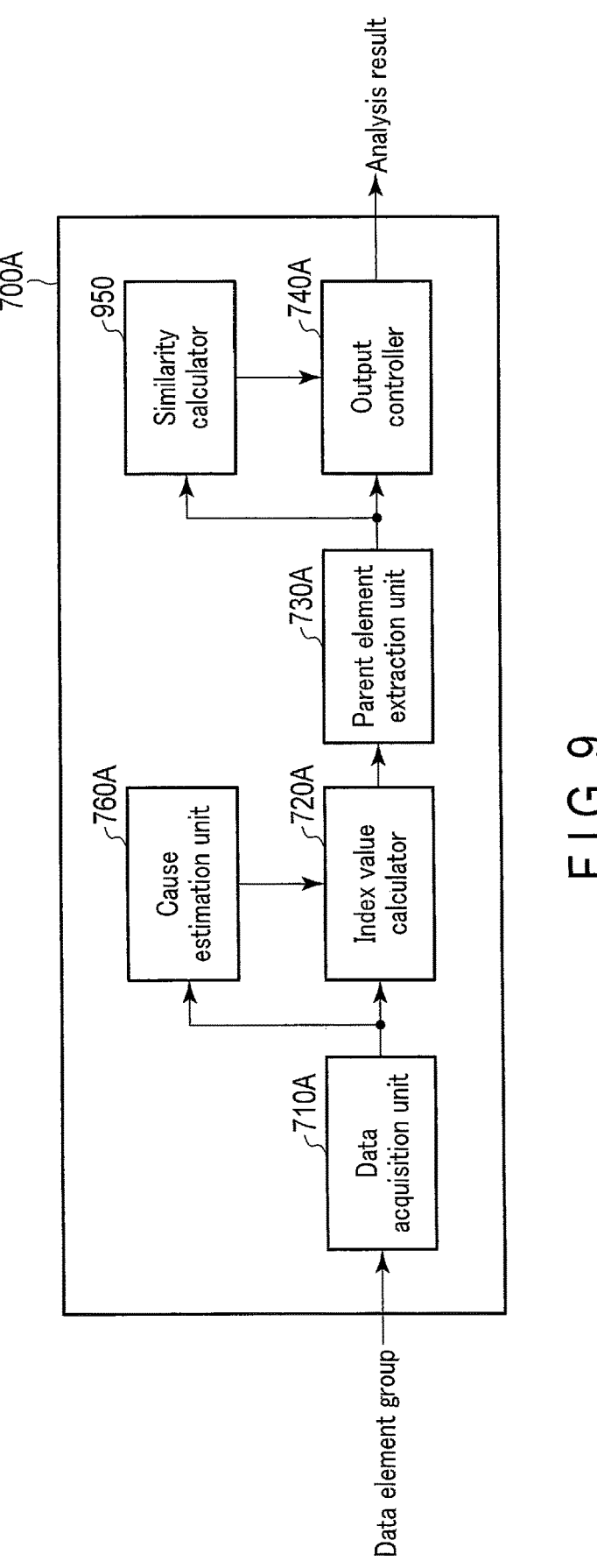
FIG. 9 is a block diagram exemplarily illustrating a configuration of a data analysis apparatus according to a modification of the second embodiment.

In general, according to one embodiment, a data analysis apparatus includes processing circuitry. The processing circuitry acquires a data element group composed of a plurality of data elements, calculates, in regard to a first data element in the data element group, an index value indicative of a conditional dispersion from another data element in the data element group, extracts, based on the index value, a parent element having a high association with the first data element from the data element group, and outputs an analysis result including first information relating to the first data element and the parent element.

Hereinafter, embodiments of a data analysis apparatus will be described in detail with reference to the accompanying drawings.

First Embodiment

FIG. 1 is a block diagram exemplarily illustrating a configuration of a data analysis system including a data analysis apparatus according to a first embodiment. A data analysis system 1 of FIG. 1 includes a data analysis apparatus 100, an output device 110, and a storage device 120. The data analysis apparatus 100 analyzes data that is read out from the storage device 120. The output device 110 displays, for example, an analysis result by the data analysis apparatus 100. Hereinafter, the output device 110 and storage device 120 will first be described.

The output device 110 is, for example, a monitor. The output device 110 receives an analysis result from the data analysis apparatus 100. The output device 110 displays the analysis result. Note that the output device 110 is not limited to the monitor, and may be, for example, another data analysis apparatus and a terminal device.

The storage device 120 is, for example, a nonvolatile memory such as an HDD (Hard Disk Drive) or an SSD (Solid State Drive). The storage device 120 stores a data element group. The data element group is composed of, for example, a plurality of data elements.

The data elements (data columns) include, for example, a plurality of data samples expressed collectively by a categorical value or a numerical value. Specifically, the data samples are, for example, predetermined measurement values (e.g. measurement values of quality indices (e.g. a size, a strain, an electric characteristic, or the like), or defective fractions) corresponding to individual products, product groups (e.g. lots) or times of manufacture, manufacturing conditions, or data of used members. For instance, if a certain data element is data of a used member, this data element may be correlated with data of members used in different products. The data element group may be a data element group in which data samples of data elements are correlated, and may be, for example, data including quality index values (first data elements) and used members (second data elements) in regard to individual products.

Note that the data elements are not limited to the data relating to the manufacturing industry, and may include, for example, data relating to the retailing industry (e.g. the number of customers in a predetermine period (every day, every week, or the like), sales amounts, sales prices, presence/absence of sales, presence/absence of advertisement, and the like), and data relating to stock prices, epidemiology, electric power consumption, and the like. The data elements may include, for example, calendar information of a day, a season, a national holiday, a holiday, or the like; meteorological information of temperatures, weather (fine weather, rainy weather, or the like), rainfall level, snowfall amount, wind velocity or the like; information of the occurrence of a disaster or the like; personal information (personal attribute information, consumption behavior information or the like); questionnaire results; and other similar data.

FIG. 2 is a block diagram exemplarily illustrating a configuration of the data analysis apparatus of FIG. 1. The data analysis apparatus 100 of FIG. 2 includes a data acquisition unit 210, an index value calculator 220, a parent element extraction unit 230, and an output controller 240.

The data acquisition unit 210 acquires from the storage device 120 a data element group that is composed of a plurality of data elements. The data acquisition unit 210 outputs the acquired data element group to the index value calculator 220.

The data acquisition unit 210 may acquire the data element group upon receiving an instruction from a user. Specifically, the data acquisition unit 210 may be configured to acquire only designated data elements by the user designating the data elements. Thereby, only the data element group, in connection with which the user wishes to evaluate a relationship, may be set as an analysis target. In addition, by an instruction or the like from the user, the data acquisition unit 210 may reduce data samples included in the data element group. Specifically, data samples may be extracted and output, based on a specific period or a condition (e.g. a predetermined lot, a predetermined manufacturing site, or the like). Thereby, since the number of data samples that are output can be reduced, the number of analyses of the data analysis apparatus 100 can be reduced, and it becomes possible to execute evaluation by extracting only the period or condition of data elements, with respect to which the user wishes to evaluate the relationship.

Note that the data acquisition unit 210 may acquire a data element group from an external device that is different from the storage device 120. In this case, the data analysis apparatus 100 may further include an interface (e.g. a network adapter and an external storage adapter) for communicating with the external device.

The index value calculator 220 acquires the data element group from the data acquisition unit 210. The index value calculator 220 calculates an index value indicative of a conditional dispersion relating to an arbitrary data element (hereinafter, referred to "first data element") in the data element group. Specifically, as regards the first data element, the index value calculator 220 calculates an index value indicative of a conditional dispersion from another data element in the data element group. The index value calculator 220 outputs the calculated index value to the parent element extraction unit 230. Note that the first data element may be selected, for example, by the user.

In the calculation of the index value, for example, "Goodman and Kruskal's tau" may be used. The Goodman and Kruskal's tau is an index indicative of the strength of association between a row element and a column element in a cross-tab. Note that the details of the index value will be described later.

The parent element extraction unit 230 acquires the index value from the index value calculator 220. Based on the index value, the parent element extraction unit 230 extracts a parent element in regard to the first data element. Specifically, based on the index value, the parent element extraction unit 230 extracts from the data element group a parent element having a high association with the first data element. The parent element extraction unit 230 outputs the extracted parent element to the output controller 240. Note that in the present specification, the parent element may include one or a plurality of data elements. In addition, there may be a case in which no parent element is extracted by the parent element extraction unit 230. In this case, information indicating that no parent element is present may be output, and a subsequent process relating to the parent element may be skipped. The details of the extraction of the parent element will be described later.

Hereinafter, the first data element in relation to the parent element is referred to as "child element". In addition, the relationship between the parent element and the child element is referred to as "parent-child relationship". Thus, the extraction process by the parent element extraction unit 230 may also be described as a process of specifying a parent-child relationship. Hereinafter, the parent element, the child element and the parent-child relationship will concretely be described with reference to a cross-tab of FIG. 3.

FIG. 3 is a view exemplarily illustrating a cross-tab for describing the parent-child relationship. In a cross-tab 300 of FIG. 3, items of elements X1 are arranged in the row direction (the top of the table), and items of elements X2 are arranged in the column direction (the side of the table). In addition, a cell at an intersection between an arbitrary item of the elements X1 (e.g. element X1=p) and an arbitrary item of the elements X2 (e.g. element X2=a) indicates the number (e.g. 120) of data samples that satisfy the conditions of both items. The above-described "item" may be referred to as "level". In addition, the "number of data samples" may be referred to as "sample number".

The cross-tab 300 indicates elements X1, the number of levels of which is two, and elements X2, the number of levels of which is five. In addition, in the cross-tab 300, if attention is paid to each level of the elements X2, data samples are present only in one of the levels of the elements X1. Thus, it can be said that each level of the elements X1 and each level of the elements X2 have a relationship of a nest. In addition, in the present embodiment, paying attention to the fact that the number of levels of the elements X1 is different from the number of levels of the elements X2, the elements X1, the number of levels of which is smaller, are defined as "parent elements", the elements X2, the number of levels of which is greater, are defined as "child elements", and the relationship between the elements X1 and the elements X2 is defined as "parent-child relationship". Note that when the number of levels of the elements X1 is equal to the number of levels of the elements X2, the relationship between the elements X1 and the elements X2 is defined as "correlation", and the term "correlation" is used discriminately from "parent-child relationship".

Note that the cross-tab 300 illustrates the example in which data samples are present in either of the levels of the elements X1 in regard to each of the levels of the elements X2, but the cross-tab 300 is not limited to this example. For example, in the case where data samples are present in each of the levels of both elements X1 in regard to a certain level of the elements X2, if the number of data samples in the level of one of the elements X1 is very small (e.g. several % of the total sample number of the levels of the elements X1), the relationship between the elements X1 and the elements X2 may be regarded as "parent-child relationship" in a broad sense.

The output controller 240 acquires the parent element from the parent element extraction unit 230. The output controller 240 outputs an analysis result relating to the parent element to the output device 110. Specifically, the output controller 240 outputs to the output device 110 an analysis result including information relating to the first data elements and the parent element. Note that the output controller 240 may output the analysis result to the storage device 120, or may store the analysis result in a memory (not shown) included in the data analysis apparatus 100. Besides, output means to the output device 110 may be any means capable of executing transmission, whether by wired transmission or by wireless transmission. For example, the output controller 240 may output the analysis result by messaging means such as email.

Note that the data analysis apparatus 100 may include a memory and a processor. The memory stores, for example, various programs (e.g. a data analysis program) relating to the operation of the data analysis apparatus 100. The processor implements the functions of the data acquisition unit 210, index value calculator 220, parent element extraction unit 230 and output controller 240, by executing the various programs stored in the memory. Furthermore, the data analysis apparatus 100 may include at least one of the output device 110 and the storage device 120.

The configuration of the data analysis apparatus 100 according to the first embodiment has been described above. Next, an operation of the data analysis apparatus 100 will be described with reference to a flowchart of FIG. 4.

FIG. 4 is a flowchart exemplarily illustrating an operation of the data analysis apparatus of FIG. 2. A process of the flowchart of FIG. 4 starts by the user executing a data analysis program.

(Step ST410)

If the data analysis program is executed, the data acquisition unit 210 acquires a data element group. Specifically, the data acquisition unit 210 acquires a data element group that is composed of a plurality of data elements.

(Step ST420)

The index value calculator 220 calculates an index value indicative of a conditional dispersion relating to the first data element. Specifically, as regards the first data element in the data element group, the index value calculator 220 calculates an index value indicative of a conditional dispersion from another element in the data element group. The details of the index value will be described below.

When the first data element and the another data element have a parent-child relationship, data samples are present in any one of the levels of the another data element in regard to each of the levels of the first data element. Specifically, the relationship between the first data element and the another data element is in such a state that a deviation of data samples in each level is large or a dispersion of data samples is small. From this, by calculating the index value indicative of the greatness of the deviation of each level of two data elements or the smallness of the dispersion, the index value can be used for evaluating the parent-child relationship. When it is assumed that the two data elements are x and y, an index value $\alpha(x, y)$ can be calculated by equation (1) below.

$$\alpha(x, y) = \frac{V(y) - E[V(y|x)]}{V(y)} \tag{1}$$

In equation (1), V(y) represents a dispersion of the data element y, V(y|x) represents a dispersion of the data element y in each level of the data element x, and E represents an expected value. Specifically, the index value $\alpha$ represents the "smallness" of the dispersion of the data element y in each level of the data element x by a scale of 0 to 1.

Thus, by using the above equation (1), the index value calculator 220 can calculate the index value $\alpha$ between the first data element and each of the other data elements in the data element group.

Next, a case in which each of the two data elements is a categorical value will be described. For example, when each of the data elements x and y is a categorical value, V(y) and E[V(y|x)] may be expressed by using equations (2) and (3) below.

$$V(y) = 1 - \sum_{j=1}^{J} \pi_{+j}^2 \tag{2}$$

<div style="display:flex;justify-content:space-between"><span>7</span><span>8</span></div>

-continued $$E[V(y|x)] = 1 - \sum_{i=1}^{I} \sum_{j=1}^{J} \frac{\pi_{+j}^2}{\pi_{i+}} \quad (3)$$

In equations (2) and (3), $\pi_{ij}$, $\pi_{i+}$, and $\pi_{+j}$ are expressed as follows.

$$\begin{cases} \pi_{ij} = \dfrac{N_{ij}}{N} \\ \pi_{i+} = \displaystyle\sum_{j=1}^{J} \pi_{ij} \\ \pi_{+j} = \displaystyle\sum_{i=1}^{I} \pi_{ij} \end{cases}$$

Here, N represents a sample number, and $N_{ij}$ represents a sample number that meets a condition of data element x=i, y=i. In addition, I and J represent the numbers of levels of the data elements x and y.

The index value $\alpha$ calculated by using the above equations (2) and (3) corresponds to Goodman and Kruskal's tau. Thus, as regards the data elements represented by categorical values, the index value calculator 220 may calculate the Goodman and Kruskal's tau as the index value $\alpha$.

Next, a case in which at least one of two data elements is data of a continuous value (continuous-value data) will be described. The index value calculator 220 may generate discrete data by executing such discretization that the continuous-value data has an arbitrary number of levels, and may calculate the index value $\alpha$ by deeming the discrete data as the categorical value. For the generation of the discrete data, various kinds of clustering methods (e.g. K-means method) may be used.

As a similar concept to the discretization, the index value calculator 220 may execute quantization. For the quantization, for example, a Lloyd-Max quantizer may be used. At this time, as a quantization width, for example, a preset value may be used, or the quantization width may be set such that the number of levels after the quantization becomes a predetermined value. In addition, as another method, under the constraint that one of index values (e.g. index value $\alpha$(x, y)) is 1, a value that minimizes the other index value (e.g. index value $\alpha$(y, x)) may be used as the quantization width, and a quantization point may be searched by using this method.

Next, a case in which one of two data elements is a categorical value and the other is a continuous value will be described. In this case, a variance may be used for the index value $V(\cdot)$ that is indicative of a dispersion. For example, when a data element x is a categorical value and a data element y is a continuous value, $V(y)$ and $V(y|x)$ may be a variance of the data element y and a variance of the data element y in each level of the data element x. In this manner, when the index value $\alpha$(x, y) is calculated by using the variance, and the other index value $\alpha$(y, x) may be a predetermined value (e.g. zero), or Goodman and Kruskal's tau may be used therefor after discretizing (or quantizing the data element y that is the continuous value.
(Step ST430)

The parent element extraction unit 230 extracts a parent element in regard to the first data element. Specifically, the parent element extraction unit 230 extracts, from the data element group, a parent element having a high association with the first data element. Hereinafter, the details of the extraction of the parent element will be described.

Assuming that the first data element is the above-described data element x, if the other data element y is the parent element, a condition that the index value $\alpha$(x, y)=1 and the index value $\alpha$(y, x)<1 is established. Thus, the parent element extraction unit 230 extracts, from the data element group, the data element y, which meets the above condition, as the parent element of the data element x (the first data element).

If some latitude is to be given to the condition for the extraction, such a condition may be set that the index value $\alpha$(x, y)>a first threshold, and the index value $\alpha$(y, x)<a second threshold. Each of the first threshold and second threshold may be a freely chosen value of 0 to 1, and may be preset. In practice, for example, the first threshold is set at a value close to 1 (e.g. 0.8 or 0.9), and the second threshold is set at a value equal to or less than the first threshold (e.g. 0.8 or 0.5).
(Step ST440)

The output controller 240 outputs an analysis result relating to the parent element. Specifically, the output controller 240 outputs an analysis result including information relating to the first data element and the parent element. After step ST440, the data analysis program ends.

The analysis result is, for example, data in which parent elements in regard to the first data element are enumerated. In a concrete example, if the first data element is an element X and the parent elements are elements Y1, Y2, Z1, Z2, Z3, and W, the analysis result may be a structure including information indicative of the first data element (element name or the like) and information indicative of the parent elements of the first data element (array or element names, or the like), such as {element_name: X, parent_elements: [Y1, Y2, Z1, Z2, Z3, W]}. Here, {A: X, B: Y} is indicative of a structure, A and B are indicative of element names that constitute the structure, and X and Y are indicative of values of the elements. In addition, [X1, X2, . . . ] is indicative of an array.

Alternatively, the analysis result may be expressed by a character string in which the above-described structure is serialized by a predetermined format (e.g. JSON, XML, YAML, or the like), or may be expressed by a list of an element name and parent elements thereof by delimiter characters, such as CSV, or may be expressed by a binary array by adding an ID to each element.

Note that when no parent element is extracted by the above process, i.e. when a parent element corresponding to the first data element is absent, information indicative of the absence of a parent element may be output. The analysis result in this case may indicate that a parent element is absent, by using an empty array or the like, such as {element_name: X, parent_element: [ ]}. Instead of the empty array, a preset symbol (NULL, numerical value, character string, or the like) may be used.

In addition, as in the above-described concrete example, when a plurality of parent elements are enumerated in the analysis result, the data analysis apparatus 100 may further analyze the parent-child relationship between the parent elements. Specifically, the parent element extraction unit 230 outputs the extracted parent elements to the index value calculator 220. Then, the index value calculator 220 calculates an index value between each of the parent elements, which is used as a reference, and another parent element, and outputs the index value to the parent element extraction unit 230. Thereafter, based on the calculated index value, the parent element extraction unit 230 specifies a parent-child relationship between parent elements. Specifically, the data analysis apparatus 100 repeatedly executes the calculation of the index value and the output of the parent element in regard to each of the parent elements, thereby analyzing the parent-child relationship between the parent elements.

In one concrete example, it is assumed that the data analysis apparatus 100 specifies the parent elements Z1 and Z2 in regard to the element Y1, specifies the parent elements Z2, Z3 and W in regard to the element Y2, and specifies the parent element W in regard to the element Z3. At this time, although the parent element W has a parent-child relationship with each of the elements Y2 and Z3, the direct parent-child relationship of the parent element W is with the element Z3. Thus, the analysis result may be a list of structures, such as [{element_name: X, parent_elements: [Y1, Y2]}, {element_name: Y1, parent_elements: [Z1, Z2]}, {element_name: Y2, parent_elements: [Z2, Z3]}, and {element_name: Z3, parent_element: [W]}].

With the parent-child relationships between the parent elements being specified, the analysis result may be, for example, data indicative of a hierarchical structure based on the first data element and the parent elements. Hereinafter, as an example of the hierarchical structure, a tree structure will be described with reference to FIG. 5.

FIG. 5 is a view exemplarily illustrating a tree structure for describing a hierarchical parent-child relationship. A tree structure 500 of FIG. 5 is composed such that an element X that is a first data element is a root node, and elements Y1, Y2, Z1, Z2, Z3 and W, which are parent elements, are internal nodes or leaf nodes. Specifically, the tree structure 500 indicates, as regards parent elements, parent elements (elements Z1 and Z2) in regard to the element Y1, parent elements (elements Z2 and Z3) in regard to the element Y2, and a parent element (element W) in regard to the element Z3.

In the tree structure 500, the elements Y1, Y2 and Z3 correspond to internal nodes, and the elements Z1, Z2 and W correspond to leaf nodes. In addition, each node stores information indicative of the data element (e.g. data element name and index), and information indicative of a parent element (e.g. data element name and index).

By the above, the output controller 240 may output, as the analysis result, a structure associated with a parent-child relationship between data elements, a list of structures, or a character string formed by serializing the structure or structures, or may output a graphical analysis result such as a tree structure, or may output both. For example, in the case of the graphical analysis result, the user can visually understand the relationship between data elements.

As described above, the data analysis apparatus according to the first embodiment acquires a data element group composed of a plurality of data elements; calculates, in regard to a first data element in the data element group, an index value indicative of a conditional dispersion from another data element in the data element group; extracts, based on the index value, a parent element having a high association with the first data element from the data element group; and outputs an analysis result including first information relating to the first data element and the parent element.

When a factor of a change of certain data Y is to be estimated, as described in the beginning of the specification, if a parent-child relationship exists between data elements X, an effect (influence) of a parent element is inherited to a child element. According to this data analysis apparatus, with respect to a given data element, parent elements of the given data element are enumerated and output. Thereby, it becomes possible for the user to understand a data element which may possibly inherit the effect, or to output the data element to another data analysis apparatus. Thereby, when a factor of a change of observation data is to be analyzed, the factor can be prevented from being overlooked.

The data analysis apparatus according to the first embodiment may evaluate the parent-child relationship of the entirety of the data element group, instead of extracting the parent elements in regard to a given first data element. In this case, the index value calculator 220 may calculate an index value α in regard to an arbitrary combination of data elements, and the parent element extraction unit 230 may evaluate a parent-child relationship from the index value α in regard to the arbitrary combination. Thereby, the parent-child relationship between elements in the data element group can be evaluated without designating the first data element.

Modification of the First Embodiment

A data analysis apparatus according to a modification of the first embodiment is constituted by adding a similarity calculator to the configuration of the data analysis apparatus according to the first embodiment. When a plurality of parent elements are extracted, the similarity calculator calculates a similarity between the parent elements. In general, when a plurality of data elements are present in a data element group, there is a case in which identical or similar data elements are included in the data element group. For example, when two similar data elements are present in the data element group, correspondence relations (e.g. correlations or influences) with another data element are also similar in many cases. From this, it is important to understand similar data elements, when the factor of the change of the data Y is searched.

FIG. 6 is a block diagram exemplarily illustrating a configuration of a data analysis apparatus according to the modification of the first embodiment. A data analysis apparatus 100A of FIG. 6 includes a data acquisition unit 210A, an index value calculator 220A, a parent element extraction unit 230A, an output controller 240A, and a similarity calculator 650. Note that the data acquisition unit 210A and index value calculator 220A are similar to the data acquisition unit 210 and index value calculator 220 of FIG. 2, and thus a description thereof is omitted. In addition, the parent element extraction unit 230A and output controller 240A are substantially similar to the parent element extraction unit 230 and output controller 240 of FIG. 2, except for a process relating to the addition of the similarity controller 650, and thus a description thereof is partly omitted.

The parent element extraction unit 230A acquires the index value from the index value calculator 220A. Based on the index value, the parent element extraction unit 230A extracts the parent element in regard to the first data element. The parent element extraction unit 230A outputs the extracted parent element to the output controller 240A and the similarity calculator 650.

The similarity calculator 650 acquires the parent element from the parent element extraction unit 230A. When a plurality of parent elements are present, the similarity calculator 650 calculates a similarity between two data elements among the parent elements. The similarity calculator 650 outputs the calculated similarity to the output controller 240A.

The calculation of the similarity may be executed by using, for example, "Pearson's product-moment correlation coefficient", "Spearman's rank correlation coefficient", "Kendall's rank correlation coefficient", and "MIC (Maximal Information Coefficient". In addition, when a data sample of a data element is a categorical value, the calculation of the similarity may be executed by using "Goodman and Kruskal's tau", "Cramer's V", and the like. Note that when the Goodman and Kruskal's tau is used for the calculation of the similarity, a smaller one of two values, which are calculated by using two data elements, may be used.

The output controller 240A acquires the parent elements from the parent element extraction unit 230A, and acquires the similarity from the similarity calculator 650. The output controller 240A outputs an analysis result, in which the similarity is taken into account, to the output device 110. Specifically, when the similarity exceeds a predetermined threshold, the output controller 240A may group the two data elements corresponding to the similarity.

The analysis result, in which the similarity is taken into account, is, for example, data in which the parent elements in regard to the first data element are further grouped and enumerated. In one concrete example, if the first data element is an element A and the parent elements are elements B1, B2, B3 and B4, the analysis result before grouping is expressed by such a structure as {element_name: A, parent_elements: [B1, B2, B3, B4]}. Here, if the parent elements B2 and B3 are grouped, the analysis result, in which the similarity is taken into account, may be expressed by an array or a structure with respect to the part of the grouped elements, such as {element_name: A, parent_elements: [B1, [B2, B3], B4]}.

In addition, as the analysis result in which the similarity is taken into account, the combination of similar elements may be separately output. In this case, the analysis result, in which the similarity is taken into account, may be expressed by an analysis result (a structure) (before grouping) in which the similarity is not taken into account, and a structure including an array of similar elements, such as {element_name: A, parent_elements: [B1, B2, B3, B4]}, {similar_elements: [B2, B3]}. Note that the analysis result, in which the similarity is taken into account, may be output together with a value of similarity exceeding a predetermined threshold (for example, {similar_elements: [B2, B3], similarity: 90%}).

Furthermore, the output controller 240A may generate a two-dimensional heat map, based on the similarity. The two-dimensional heat map is configured such that a plurality of parent elements are arranged in each of the row direction and the column direction, and values of similarity are made to correspond to the densities of colors, or hues. The output controller 240A may output the generated two-dimensional heat map to the output device 110, separately from the analysis result, or may output the generated two-dimensional heat map to the output device 110 by incorporating the generated two-dimensional heat map into the analysis result. By the output of the two-dimensional heat map, the user can visually understand the similarity relationship between the data elements.

As described above, in addition to the process of the data analysis apparatus according to the first embodiment, the data analysis apparatus according to the modification of the first embodiment calculates the similarity between two data elements among parent elements, and outputs the analysis result based on the calculated similarity.

Therefore, the data analysis apparatus according to the modification of the first embodiment enables the user to more easily understand the analysis result, by extracting and grouping similar elements among the parent elements.

Note that in the modification of the first embodiment, the similarity calculator is separately provided, but the modification is not limited to this. For example, the parent element extraction unit or the output controller may execute the process of the similarity calculator.

Second Embodiment

A data analysis apparatus according to a second embodiment is constituted by adding a cause estimation unit to the configuration of the data analysis apparatus according to the first embodiment. The cause estimation unit estimates a causal element that is a cause of a change of a specific data element. The specific data element is, for example, a data element to which the user pays attention, or a data element which the user wishes to evaluate a cause of its change. For example, in the case of data in the manufacturing industry, the specific data element may be either a measurement value of a quality index value or the presence/absence of a defect in regard to each product, or a defective fraction or the like in regard to each lot.

In the first embodiment, the description was given of the calculation of the index value and the extraction of the parent element with use of an arbitrary data element (first data element) in the data element group. However, the selection of the first data element is entrusted to, for example, the user. On the other hand, in the present embodiment, by replacing the first data element with a causal element that is estimated, the data analysis apparatus can properly set the first data element, and can suppress overlooking of a factor when analyzing a causal element that is the cause of the change of the specific data element.

FIG. 7 is a block diagram exemplarily illustrating a configuration of a data analysis apparatus according to the second embodiment. A data analysis apparatus 700 of FIG. 7 includes a data acquisition unit 710, an index value calculator 720, a parent element extraction unit 730, an output controller 740, and a cause estimation unit 760. Note that the data acquisition unit 710, index value calculator 720, parent element extraction unit 730, and output controller 740 are substantially similar to the data acquisition unit 210, index value calculator 220, parent element extraction unit 230, and output controller 240 of FIG. 2, except for a process relating to the addition of the cause estimation unit 760, and thus a description thereof is partly omitted.

The data acquisition unit 710 acquires a data element group from the storage device 120. The data acquisition unit 710 outputs the acquired data element group to each of the cause estimation unit 760 and the index value calculator 720.

The cause estimation unit 760 acquires the data element group from the data acquisition unit 710. The cause estimation unit 760 estimates, from the data element group, a data element that is a cause of a change, or a data element associated (correlated) with the cause of the change, in regard to a change of the specific data element (for example, a change of an expected value, or a change of a dispersion). Specifically, the cause estimation unit 760 executes regression analysis by using the specific data element and the data element group, thereby estimating a causal element that is the cause of the factor of change. The cause estimation unit 760 outputs the estimated causal element to the index value calculator 720. Note that in the present specification, the causal element may include one or a plurality of data elements. In addition, there may be a case in which no causal element is extracted by the cause estimation unit 760. In this case, a subsequent-stage process (extraction of a parent element, or the like) for the causal element may be skipped. The details of the estimation of the causal element will be described later.

The index value calculator 720 acquires the data element group from the data acquisition unit 710, and acquires the causal element from the cause estimation unit 760. When the number of causal elements is one, the index value calculator 720 may treat the causal element as the first data element described in the first embodiment, and may calculate an index value indicative of a conditional dispersion between this data element and another data element. When the number of causal elements is plural, the index value calculator 720 may treat each of the causal elements as the above-described first data element, and may calculate an index value indicative of a conditional dispersion between each causal element and another data element. The index value calculator 720 outputs the calculated index values to the parent element extraction unit 730.

The parent element extraction unit 730 acquires the index values from the index value calculator 720. Based on the index values, the parent element extraction unit 730 extracts, in regard to each of the causal elements, a parent element having a high association with each causal element from the data element group. The parent element extraction unit 730 outputs the parent element, which corresponds to each of the causal elements, to the output controller 740.

The output controller 740 acquires the parent element, which corresponds to each of the causal elements, from the parent element extraction unit 730. The output controller 740 outputs an analysis result including information relating to the causal element and the parent element in regard to each of the causal elements. Thus, the output controller 740 may output, as the analysis result, data (structure) associated with a parent-child relationship between data elements in regard to each of the causal elements, or a character string formed by serializing this data (structure) in a predetermined format (e.g. JSON, XML, YAML, or the like). Alternatively, in regard to each of the causal elements, a graphical analysis result such as a tree structure may be output, or both data and graphic may be output.

Note that the data analysis apparatus 700 may include a memory and a processor. The memory stores, for example, various programs (e.g. a data analysis program) relating to the operation of the data analysis apparatus 700. The processor implements the functions of the data acquisition unit 710, index value calculator 720, parent element extraction unit 730, output controller 740 and cause estimation unit 760, by executing the various programs stored in the memory. Furthermore, the data analysis apparatus 700 may include at least one of the output device 110 and the storage device 120.

The configuration of the data analysis apparatus 700 according to the second embodiment has been described above. Next, an operation of the data analysis apparatus 700 will be described with reference to a flowchart of FIG. 8.

FIG. 8 is a flowchart exemplarily illustrating an operation of the data analysis apparatus of FIG. 7. A process of the flowchart of FIG. 8 starts by the user executing a data analysis program.
(Step ST810)

If the data analysis program is executed, the data acquisition unit 710 acquires a data element group. Specifically, the data acquisition unit 710 acquires a data element group that is composed of a plurality of data elements including a specific data element.

(Step ST820)

The cause estimation unit 760 estimates a causal element that is a cause of a change. Specifically, the cause estimation unit 760 estimates a causal element that is a cause of a change factor, by executing regression analysis by using the specific data element and the data element group. Hereinafter, the details of the estimation of the causal element will be described.

To be more specific, the cause estimation unit 760 estimates the causal element by executing regression analysis by using each data element of the data element group as an explanatory variable and by using the specific data element as an objective variable. For example, when a given data element (e.g. data element a) is a cause of a change of the specific data element (e.g. data element Y), or relates to, or correlates with the cause, it is expected that a regression model with good fitness to the data element Y is obtained by the regression analysis using the data element a as the explanatory variable A. The regression model with good fitness is, for example, a model with a small regression error (e.g. least square error), or a model with a high likelihood. Thus, the cause estimation unit 760 can estimate the element (causal element) that is the cause of the change factor of the data element Y, by executing the regression analysis with respect to an arbitrary data element, and searching a data element with a least regression error or a greatest likelihood.

As the method of the regression analysis, use is made of, for example, linear regression, generalized linear regression (e.g. logistic regression and Poisson regression), base linear regression, kernel regression, support vector regression, a multilayer perceptron, a regression tree, and a random forest. When a data element is a categorical value, the cause estimation unit 760 may execute regression analysis after subjecting this data element to One-Hot encoding.

In addition, the cause estimation unit 760 may estimate the causal element by using an index different from the regression error. In general, when data elements with a large number of levels, or combinations of many data elements, are used as explanatory variables, there is a tendency that the regression error becomes small. In order to estimate the causal element that is the change factor of the data element Y without depending on this tendency, the causal element may be estimated by using a model comparison index in which the complexity of a model (e.g. the number of explanatory variables, or the regularization strength in non-linear regression) is taken into account, in addition to the fitness of a model.

As the model comparison index, use is made of, for example, Akaike Information Criterion (AIC), Bayesian Information Criterion (BIC), Widely Application Information Criterion (WAIL), and Mallows' Cp.

As another index, a cross-validation (e.g. Leave-One-Out cross-validation and K-fold validation) error may be used.

An index value using the above-described indices indicates that the likelihood of a model becomes higher as the index value becomes smaller. On the other hand, in order to estimate the likelihood of a model, a marginal likelihood in a regression model or an approximate value of the marginal likelihood may be used. When these are used, it is indicated that as the value becomes higher, the likelihood of the model becomes higher. The model comparison index, such as the above-described BIC, can be regarded as an approximate value of the value (log marginal likelihood) indicative of the likelihood of the model. Thus, the cause estimation unit 760 may use the value indicative of the likelihood of the model (e.g. the value of AIC or BIC, the marginal likelihood, or the value of the logarithm thereof (log marginal likelihood)) as a score for estimating the change factor of the data element Y. Hereinafter, the description will be given on the assumption that as this score is higher, a model is closer to a maximum likelihood model.

In other words, the cause estimation unit 760 may estimate, as the causal element, an explanatory variable (data element) of a model in which the score indicative of the likelihood of the model is maximum. In addition, the cause estimation unit 760 may estimate data elements, the scores of which are in high ranks, as a plurality of causal elements. The number of causal elements that are estimated may be preset, or may be the number of data elements, the scores of which are equal to or greater than a predetermined threshold (e.g. equal to or greater than a value obtained by subtracting or dividing a predetermined amount from the maximum score). Furthermore, the cause estimation unit 760 may sort the estimated causal elements according to scores, or may correlate the causal elements with the scores.

(Step ST830)

The index value calculator 720 calculates an index value indicative of a conditional dispersion between the causal element and another data element. Specifically, in regard to each of the causal elements, the index value calculator 720 calculates an index value indicative of a conditional dispersion from another data element in the data element group.

(Step ST840)

The parent element extraction unit 730 extracts a parent element in regard to the causal element. Specifically, in regard to each of the causal elements, the parent element extraction unit 730 extracts, based on the index value, a parent element having a high association with each causal element from the data element group.

(Step ST850)

The output controller 740 outputs an analysis result relating to the parent element. Specifically, in regard to each of the causal elements, the output controller 740 outputs an analysis result including information relating to the causal element and the corresponding parent element. After step ST840, the data analysis program ends.

As described above, in addition to each process of the data analysis apparatus according to the first embodiment, the data analysis apparatus according to the second embodiment estimates the causal element that is the cause of the change and replaces the first data element with the estimated causal element, and then the data analysis apparatus can calculate the index value and extract the parent element.

Thus, the data analysis apparatus according to the second embodiment can execute detailed analysis of a change factor of observation data, by executing analysis by replacing the first data element with the estimated causal element.

Besides, as described above, when a parent-child relationship exists between data elements, the effect (influence) of a parent element is inherited to a child element. Hence, in many cases, the data element obtained as a cause estimation result is a data element with a large number of levels, which corresponds to the child element. In such cases, by enumerating and outputting parent elements, it becomes possible to make the user, or another data analysis apparatus, recognize a parent element, the effect of which was possibly inherited to the data element of the cause estimation result.

Applied Example of the Second Embodiment

In the above-described second embodiment, the causal element is estimated by the cause estimation unit. However, no consideration is given to the estimation of a combination of causal elements. Thus, in an applied example of the second embodiment, the estimation of a combination of causal elements by the cause estimation unit will be described. Note that the description will be given on the assumption that the cause estimation unit 760 of the second embodiment executes various processes relating to the applied example of the second embodiment.

As described above, the cause estimation unit 760 executes the cause estimation by executing regression analysis by using each of the data elements of the data element group, or a combination thereof, as an explanatory variable, and by using the specific data element as an objective variable. Specifically, a cause candidate that is output from the cause estimation unit 760 is not limited to a single data element, but may be a combination of data elements. Regression using a plurality of data elements is called "multiple regression". The combination of data elements may be a combination of continuous values, a combination of categorical values, or a combination thereof. The cause estimation unit may output data elements with a high index (score) of "likelihood of cause", including a combination of data elements.

The cause estimation unit 760 may estimate a combination of data elements with a high score, by using a method such as Lasso or Group Lasso. For example, the cause estimation may be executed by Group Lasso in which categorical values are One-Hot encoded as one group, continuous values are formed as a group in regard to each element (a group by one element), and an arbitrary data element of the data element group is used as an explanatory variable. In this case, regression is executed by changing the regularization strength, and a regression model at a time when the score becomes maximum is acquired. In Lasso, there is a characteristic that each coefficient, excluding necessary coefficients, tends to become zero. Hence, in the acquired regression model, a data element having a coefficient that is not zero may be output as a cause candidate.

Aside from the above-described methods, the cause estimation unit 760 may search the combination of data elements with a maximized score, by using various combinational optimization methods such as a full search, a greedy algorithm, and the like.

Besides, when the cause estimation unit 760 outputs a combination of data elements as a cause candidate, the index value calculator 720 and parent element extraction unit 730 may execute index value calculation and parent element extraction by using each element of the combination as the first data element, and may output the analysis result to the output controller 740.

Modification of the Second Embodiment

A data analysis apparatus according to a modification of the second embodiment is constituted by adding a similarity calculator to the configuration of the data analysis apparatus according to the second embodiment.

FIG. 9 is a block diagram exemplarily illustrating a configuration of a data analysis apparatus according to the modification of the second embodiment. A data analysis apparatus 700A of FIG. 9 includes a data acquisition unit 710A, an index value calculator 720A, a parent element extraction unit 730A, an output controller 740A, a cause estimation unit 760A, and a similarity calculator 950. Note that the data acquisition unit 710A, index value calculator 720A, parent element extraction unit 730A and cause estimation unit 760A are similar to the data acquisition unit 710, index value calculator 720, parent element extraction unit 730 and cause estimation unit 760 of FIG. 7, and thus a description thereof is omitted. In addition, the similarity calculator 950 and output controller 740A are substantially similar to the similarity calculator 650 and output controller 240A of FIG. 6, and thus a description thereof is partly omitted. Note that, hereinafter, a description will be given of a case in which the number of causal elements estimated by the cause estimation unit 760A is plural.

The similarity calculator 950 acquires the parent element, which corresponds to each causal element, from the parent element extraction unit 730A. When a plurality of parent elements are present in regard to each of the causal elements, the similarity calculator 950 calculates a similarity between two data elements among the parent elements. The similarity calculator 950 outputs the similarity, which was calculated in regard to each of the causal elements, to the output controller 740A.

The output controller 740A acquires the parent elements, which corresponds to each of the causal elements, from the parent element extraction unit 730A, and acquires the similarity, which was calculated in regard to each of the causal elements, from the similarity calculator 950. The output controller 740A outputs an analysis result, in which the similarity is taken into account in regard to each of the causal elements, to the output device 110.

As described above, in addition to the process of the data analysis apparatus according to the second embodiment, the data analysis apparatus according to the modification of the second embodiment calculates the similarity between two data elements among the parent elements, in regard to each of the causal elements, and outputs the analysis result based on the calculated similarity.

Therefore, the data analysis apparatus according to the modification of the second embodiment enables the user to more easily understand the analysis result, by extracting and grouping similar elements among the parent elements, in regard to each of the causal elements.

Note that in the modification of the second embodiment, the similarity calculator is separately provided, but the modification is not limited to this. For example, the parent element extraction unit or the output controller may execute the process of the similarity calculator.

Third Embodiment

A data analysis apparatus according to a third embodiment is constituted by adding an effect size calculator to the configuration of the data analysis apparatus according to the first embodiment. The effect size calculator calculates an effect size on a change of a specific data element. In the first embodiment, it was described that parent elements are enumerated or indicated by a hierarchical structure in regard to the first data element. However, when a plurality of parent elements are present in regard to the first data element, it is difficult to understand which element of the first data element and parent elements has a great influence (effect). On the other hand, in the present embodiment, the user can easily specify a parent element having a great influence, by calculating an effect size with respect to the first data element and parent elements.

FIG. 10 is a block diagram exemplarily illustrating a configuration of the data analysis apparatus according to the third embodiment. A data analysis apparatus 1000 of FIG. 10 includes a data acquisition unit 1010, an index value calculator 1020, a parent element extraction unit 1030, an output controller 1040, and an effect size calculator 1070. Note that the index value calculator 1020 is similar to the index value calculator 220 of FIG. 2, and thus a description thereof is omitted. In addition, the data acquisition unit 1010, parent element extraction unit 1030 and output controller 1040 are substantially similar to the data acquisition unit 210, parent element extraction unit 230 and output controller 240 of FIG. 2, and thus, a description thereof is partly omitted.

The data acquisition unit 1010 acquires the data element group from the storage device 120. The data acquisition unit 1010 outputs the acquired data element group to the index value calculator 1020 and the effect size calculator 1070.

The parent element extraction unit 1030 acquires the index value from the index value calculator 1020. Based on the index value, the parent element extraction unit 1030 extracts a parent element in regard to the first data element. The parent element extraction unit 1030 outputs the extracted parent element to the output controller 1040 and the effect size calculator 1070.

The effect size calculator 1070 acquires the data element group from the data acquisition unit 1010, and acquires the parent element from the parent element extraction unit 1030. The effect size calculator 1070 calculates an effect size in regard to the first data element and the parent element, with respect to the change (e.g. a change of an expected value or a change of a dispersion) of the specific data element. In other words, the effect size calculator 1070 calculates an effect size on the change of the specific data element, in regard to the first data element and the parent element. The effect size calculator 1070 outputs the calculated effect size to the output controller 1040. Note that the details of the calculation of the effect size will be described later.

The output controller 1040 acquires the parent element from the parent element extraction unit 1030, and acquires the effect size from the effect size calculator 1070. The output controller 1040 outputs the analysis result including information relating to the effect size to the output device 110. In addition, when a probability distribution of the effect size is calculated, the output controller 1040 may output the analysis result including information relating to the probability distribution to the output device 110.

The analysis result including the information relating to the effect size is, for example, data in which parent elements in regard to the first data element are enumerated, and data of the effect size in regard to the first data element and the parent elements. Since the data in which the parent elements are enumerated, and the data of the effect size are output together, the user can understand the effect size of the parent element on the change of the specific data element, and can easily search the cause of the change factor.

Besides, the analysis result including the information relating to the probability distribution includes the information relating to the precision of the effect size, in addition to the analysis result including the information relating to the effect size. The information relating to the precision of the effect size is, for example, an expected value or a median of the effect size, and a variance, a standard deviation or a confidence interval thereof. Furthermore, the information relating to the precision of the effect size may include, for example, information indicative of a correlation of the effect size (e.g. a covariance matrix or a correlation matrix). By these, the user can understand the information relating to the precision of the effect size.

In addition, the output controller 1040 may change the display mode of the data in which the parent elements in regard to the first data element are enumerated, in accordance with the value of the effect size. The change of the display mode includes, for example, sorting the display order of the first data element and parent elements, and includes changing at least one of a character size, a thickness and a character color of a character string that displays the first data element and parent elements.

Specifically, the output controller 1040 outputs the analysis result by sorting the display order in accordance with the values of the effect sizes of the data elements (e.g. by arrangement in the order from the greatest effect size). In addition, the output controller 1040 outputs the analysis result by emphasizing an element with a great effect size (e.g. enlarging the character size, displaying characters in bold face, or coloring characters) in accordance with the values of the effect sizes of the data elements. Besides, the output controller 1040 outputs the analysis result by changing the display color of the character string that is displayed (e.g. by such gradations that a greater value of the effect size is displayed in a color closer to red, and a smaller value of the effect size is displayed in a color closer to blue) in accordance with the values of the effect sizes of the data elements.

Furthermore, the change of the display mode may include excluding, or rendering invisible, a parent element with a small value of the effect size (e.g. a parent element with the value of the effect size, which is equal to or less than a predetermined threshold). To exclude, or render invisible, such a parent element may freely be chosen by the user's operation.

Besides, the output controller 1040 may output graphical data, such as a tree structure, together with the analysis result.

Note that the data analysis apparatus 1000 may include a memory and a processor. The memory stores, for example, various programs (e.g. a data analysis program) relating to the operation of the data analysis apparatus 1000. The processor implements the functions of the data acquisition unit 1010, index value calculator 1020, parent element extraction unit 1030, output controller 1040 and effect size calculator 1070, by executing the various programs (e.g. the data analysis program) stored in the memory. Furthermore, the data analysis apparatus 1000 may include at least one of the output device 110 and the storage device 120.

The configuration of the data analysis apparatus 1000 according to the third embodiment has been described above. Next, an operation of the data analysis apparatus 1000 will be described with reference to a flowchart of FIG. 11.

FIG. 11 is a flowchart exemplarily illustrating an operation of the data analysis apparatus of FIG. 10. A process of the flowchart of FIG. 11 starts by the user executing the data analysis program. Note that the process from step ST1110 to step ST1130 is similar to the process from step ST410 to step ST430 of FIG. 4, and thus a description thereof is omitted. In addition, after the process of step ST1130, the process advances to step ST1140.

(Step ST1140)

The effect size calculator 1070 calculates the effect size with respect to the first data element and each of the parent elements. Specifically, in regard to the first data element and the parent element, the effect size calculator 1070 calculates the effect size on the change of the specific data element. Hereinafter, the details of the calculation of the effect size will be described.

To be more specific, the effect size calculator 1070 executes regression analysis by using the first data element or the parent element as the explanatory variable and using the specific data element as the objective variable, and calculates, as the effect size, the magnitude or ratio of the contribution of the explanatory variable to the specific data element. For example, when generalized linear regression is used, the effect size may be the magnitude of the regression coefficient (e.g. an absolute value or a square value). In addition, when the data element is a categorical value, the effect size calculator 1070 may execute regression analysis after subjecting this data element to One-Hot encoding, and may set, as the effect size, a dispersion (e.g. a mean of absolute values, a standard deviation, or a variance) of coefficients obtained by the analysis. In another method, when a regression tree is used, the effect size calculator 1070 may set a feature quantity importance (e.g. Gini importance) as the effect size.

In general, it is known that when the respective data elements, which are the explanatory variable, are completely correlated (i.e. the correlation coefficient is 1), the regression coefficient is indefinite. This also applies to the case where the data elements have a parent-child relationship. Thus, the effect size calculator 1070 may execute regression analysis on the assumption that the expected value of each effect to be zero (i.e. the effect is a value close to zero).

Specifically, the effect size calculator 1070 may execute L2 regularization (i.e. ridge regression) in regard to each coefficient, or may execute Bayesian regression in which a prior distribution with an expected value of zero (e.g. a normal prior distribution with an expected value of zero) is set. By the regularization or the Bayesian regression in which a non-uniform prior distribution is set, each coefficient can be calculated and the effect size can be evaluated.

Note that when there is a known bias due to the explanatory variable by the explanatory variable (the first data element, or each of the parent elements) and the specific data element, the effect size calculator 1070 may execute a process in which the known bias is taken into account. The known bias is, for example, a difference of the expected values of the observation values among devices due to secular deterioration in the manufacturing industry. Thus, the effect size calculator 1070 may execute Bayesian regression in which a prior distribution with a known bias quantity being set as the expected value (e.g. a normal distribution with the bias quantity being set as the expected value) is set, or may execute L2 regularization based on a displacement quantity from the known bias quantity. Note that the effect size calculator 1070 may execute a process after correcting the known bias quantity (e.g. after subtracting an expected value of the specific data element for each device).

As a hyperparameter such as the strength of the above-described regularization or the variance of the prior distribution, for example, a value that is preset may be used. In addition, the hyperparameter may be used after being optimized based on data elements. For example, the effect size calculator 1070 may search and use a hyperparameter that minimizes the above-described cross-validation error or an approximate value thereof (e.g. generalized cross-validation). In addition, for example, the effect size calculator 1070 may search and use a hyperparameter that maximizes the above-described marginal likelihood, or an approximate value of the marginal likelihood.

Hereinafter, as a more concrete description, the calculation of the effect size in regard to two data elements corresponding to the first data element and the parent element thereof will be described. When the two data elements are X1 and X2, the regression model is expressed by equation (4) below.

$$g(y)=X_1\beta_1+X_2\beta_2+\varepsilon \tag{4}$$

In equation (4), $\beta_1$ and $\beta_2$ represent regression coefficients of the data elements X1 and X2, and s represents a regression error. In addition, $g(\cdot)$ represents a link function, and, for example, an identity function (g(y)=y), a logit function. (g(y)=In(y/(1−y))), and a logarithmic function (g(y)=In(y)) can be used in accordance with the range of the value of the specific data element. Note that a constant term (intercept term) may be further added to the above-described regression model. In addition, when the data elements X1 and X2 are categorical values, values obtained by subjecting these data elements to One-Hot encoding may be used.

Furthermore, a description is given of the search of parameters ($\beta_1$ and $\beta_2$) with which a loss function becomes minimum, under the above-described regression model. The loss function is expressed by, for example, equation (5) below.

$$F(y,\beta_1,\beta_2)=L(y,g^{-1}(X_1\beta_1+X_2\beta_2))+\lambda(\|\beta_1\|_2+\|\beta_2\|_2) \qquad (5)$$

In equation (5), $\|\cdot\|_2$ represents L2 norm. In addition, $L(\cdot)$ represents a loss function, and a square loss (square error), for example, may be used when the specific data element is a continuous value, a Poisson loss function, for example, may be used when the specific data element is a count value (e.g. frequency data), and a cross entropy function, for example, may be used when the specific data element is a flag (e.g. presence/absence of a defect) or a probability value (a defective fraction or the like). Besides, $\lambda$ represents a hyperparameter indicative of the strength of regularization.

Thus, by using the above equation (5), the effect size calculator 1070 can obtain optimal values of parameters ($\beta_1$ and $\beta_2$), or values of dispersion (in the case where data elements are categorical values), and therefore the effect size calculator 1070 can calculate effect sizes of the two data elements X1 and X2.

In another method, evaluation may be executed by using the above-described regression model as the Bayesian model. Specifically, a prior distribution with an expected value of zero (or a predetermined value relating to a known bias) may be set for the regression coefficients $\beta_1$ and $\beta_2$ of the two data elements X1 and X2, and a posterior distribution in regard to the two data elements X1 and X2 and the specific data element Y may be estimated. The Bayesian model is expressed by, for example, equation (6) below.

$$p(\beta_1,\beta_2|X_1,X_2,Y)\propto p(Y|g^{-1}(X_1\beta_1+X_2\beta_2))p(\beta_1,\beta_2) \qquad (6)$$

In equation (6), the left side represents a posterior distribution, the first term of the right side represents a likelihood function, and the second term of the right side represents a prior distribution. As regards the estimation of the posterior distribution, analytical evaluation is possible in the case of a linear model. In other cases (e.g. logistic regression model, and Poisson regression model), for example, evaluation may be executed by various approximate estimation methods such as Laplace approximation, variation estimation, and Markov chain Monte Carlo (MCMC). Based on the obtained posterior distribution, the effect size of each data element may be estimated by using, for example, a parameter (MAP estimation quantity) that maximizes the posterior probability. Alternatively, based on the posterior distribution, a distribution of the effect sizes of data elements may be estimated. The posterior distribution is indicative of a probability of a value that each coefficient ($\beta_1$, $\beta_2$) can take, and, if based on this posterior distribution, the range of each effect size can stochastically be evaluated. For example, samples of the coefficients ($\beta_1$, $\beta_2$) are acquired based on the posterior distribution, and the effect size is estimated in regard to each of the acquired samples, and thereby a probability distribution of effect sizes may be evaluated from the samples of the obtained effect sizes. According to this method, with respect to the effect size of each data element (X1, X2), not only the expected value thereof but also the distribution (dispersion) can be confirmed.

Alternatively, different prior distributions may be set for the coefficients ($\beta_1$, $\beta_2$) of the data elements (X1, X2). Specifically, the respective coefficients are expressed as follows.

$$\begin{cases} \beta_1 \sim N(\beta_{10}, v_1) \\ \beta_2 \sim N(\beta_{20}, v_2) \end{cases}$$

It should be noted, however, that $\beta_{10}$ and $\beta_{20}$ are expected value parameters of the prior distributions, and are, for example, zero or predetermined values (e.g. known biases). N is, for example, a normal distribution, and $\beta \sim N(\mu, \sigma)$ indicates that the left-side value $\beta$ follows the probability distribution of the right side (a distribution of expected value $\mu$ and scale $\sigma$, for example, a normal distribution). In addition, v1 and v2 are scale parameters (variance or standard deviation) of the prior distribution. For example, scale parameters v1 and v2, which maximize the marginal likelihood, may be found based on the marginal likelihood of the above model. For example, in the case of a linear model, the marginal likelihood is expressed by equation (7) below.

$$p(y) = \int p(y|\beta_1, \beta_2)p(\beta_1, \beta_2)d\beta_1 d\beta_2 \qquad (7)$$
$$= \int N(y|X_1\beta_1 + X_2\beta_2, \sigma^2)N(\beta_{10}, v_1)N(\beta_{20}, v_2)d\beta_1 d\beta_2$$

Equation (7) is a function by the scale parameters v1 and v2 and the scale $\sigma^2$ of the model error. In cases other than the linear model, by using a corresponding likelihood function instead of the normal distribution N(y| . . . ), the likelihood function may be evaluated by using, for example, various approximate estimation methods such as Laplace approximation, variation estimation, and Markov chain Monte Carlo (MCMC). Each parameter that maximizes the marginal likelihood can be searched by, for example, a gradient descent method, a Newton's method, or the like. The scale parameters v1 and v2 are parameters indicative of scales (variances) of the coefficients ($\beta_1$, $\beta_2$) of the two data elements X1 and X2. Hence, the scale parameters v1 and v2 that maximize the marginal likelihood, or values of square roots thereof, can be used as the effect sizes of the two data elements X1 and X2.

Alternatively, posterior distributions of the scale parameters v1 and v2 may be estimated by further setting prior distributions (hyper-prior distributions) for the scale parameters v1 and v2 and executing Bayesian estimation. As the hyper-prior distribution, use may be made of, for example, a uniform distribution on a positive real-number space, a half-Cauchy distribution, an inverse gamma distribution, and a gamma distribution. The estimation of the posterior distribution may be executed by, for example, a variation estimation or an MCMC method. Thereby, the probability distribution of the effect size of each data element can also be evaluated.
(Step ST1150)

The output controller 1040 outputs an analysis result relating to the parent element and the effect size. Specifically, the output controller 1040 outputs the analysis result including the information relating to the first data element and the parent element, and including the information of the effect size in regard to the first data element and the parent element. After step ST1150, the data analysis program ends.

As described above, in addition to each process of the data analysis apparatus according to the first embodiment, the data analysis apparatus according to the third embodiment can calculate the effect size in regard to the first data element and the parent element.

Therefore, since the data analysis apparatus according to the third embodiment can evaluate the parent element extracted based on the effect size, the data analysis apparatus can execute detailed analysis of the change factor of the observation data.

In addition, in general, as regards data elements having a parent-child relationship, the effect of a parent element is inherited to a child element. Hence, according to the present embodiment, since the effect size of each of data elements is estimated and output, it becomes easy to search any one of the data elements having the parent-child relationship, or a data element having a great effect on the specific data element.

Applied Example of the Third Embodiment

The effect size calculator 1070 may execute effect size estimation by assuming the sparseness of the effect size. The assumption of the sparseness is the assumption that, among data elements X (=X1, X2, . . . ) that are explanatory variables, only some elements have an effect on the specific data element. For example, the effect size may be estimated by Lasso regression or Group Lasso regression, which regularizes each coefficient by L1 norm, or Elastic Net that uses both L1 norm and L2 norm. When categorical values are explanatory variable elements, Group Lasso regression may be executed by using One-Hot-encoded categorical values as one group. Besides, regression may be executed by adding, as a regularization term, the number (L0 norm) of coefficients having values, the number of elements having effects, or the like.

Alternatively, the effect size calculator 1070 may use a Bayesian estimation method in which sparseness is assumed. This may be implemented by changing the prior distribution in regard to each coefficient. As the prior distribution in which sparseness is assumed, there are known, for example, Laplace distribution, Spike and slab prior distribution, Horseshoe prior distribution, and the like. By executing the Bayesian estimation with use of these prior distributions, the effect size calculator 1070 may estimate the effect size of each element.

Modification of the Third Embodiment

A data analysis apparatus according to a modification of the third embodiment is constituted by adding at least one of a cause estimation unit and a similarity calculator to the data analysis apparatus according to the third embodiment. Hereinafter, a description will be given of a case in which the data analysis apparatus according to the modification of the third embodiment includes both the cause estimation unit and the similarity calculator.

FIG. 12 is a block diagram exemplarily illustrating a configuration of the data analysis apparatus according to the modification of the third embodiment. A data analysis apparatus 1000A of FIG. 12 includes a data acquisition unit 1010A, an index value calculator 1020A, a parent element extraction unit 1030A, an output controller 1040A, an effect size calculator 1070A, a similarity calculator 1250, and a cause estimation unit 1260. Note that the data analysis apparatus 1000A can also be regarded as having such a configuration that an effect size calculator is added to the configuration of the data analysis apparatus 700A of FIG. 9. Thus, hereinafter, a description of a configuration overlapping the respective components of the data analysis apparatus 700A is partly omitted. In addition, hereinafter, a description will be given of a case in which the number of causal elements estimated by the cause estimation unit 1260 is plural.

The data acquisition unit 1010A acquires the data element group from the storage device 120. The data acquisition unit 1010A outputs the acquired data element group to the cause estimation unit 1260, the index value calculator 1020A and the effect size calculator 1070A.

The parent element extraction unit 1030A acquires a plurality of index values from the index value calculator 1020A. Based on the index values, the parent element extraction unit 1030A extracts, in regard to each of the causal elements, a parent element having a high association with the causal element from the data element group. The parent element extraction unit 1030A outputs the parent elements corresponding to the respective causal elements to the similarity calculator 1250, output controller 1040A and effect size calculator 1070A.

The effect size calculator 1070A acquires the data element group from the data acquisition unit 1010A, and acquires the parent elements, which correspond to the respective causal elements, from the parent element extraction unit 1030A. The effect size calculator 1070A calculates effect sizes of the causal element and each of the parent elements in regard to each of the causal elements. The effect size calculator 1070A outputs the calculated effect sizes, which were calculated in regard to the respective causal elements, to the output controller 1040A.

Note that when multiple regression analysis is executed in the cause estimation unit 1260, the effect size calculator 1070A may estimate the effect size in regard to each of the elements of the combination. In this case, the effect size calculator 1070A may execute the effect size estimation by using each element (first data element) of the combination, the parent element thereof, and the specific data element.

Alternatively, the effect size estimation may be executed by using, instead of the specific data element, a residual R obtained by subtracting an effect component of the data element (first data element), or an effect by another element of the combination, in the specific data element. The residual R in regard to a given element of the combination is a residual (a value obtained by subtracting a prediction value from the specific data element) obtained by executing prediction by excluding the effect of the given element (with the coefficient being set at zero) from a model that executed the regression of the specific data element by using the combination as the explanatory variable. By doing so, in regard to each of the elements of the multiple regression model, the parent-child relationship and the effect thereof can independently be evaluated.

The output controller 1040A acquires the parent element corresponding to each of the causal elements from the parent element extraction unit 1030A, acquires the similarity calculated in regard to each of the causal elements from the similarity calculator 1250, and acquires the effect size calculated in regard to each of the causal elements from the effect size calculator 1070A. The output controller 1040A outputs the analysis result including the information relating to the causal elements and parent elements, in which the similarity is taken into account, and the information relating to the effect sizes, in regard to each of the causal elements.

As described above, in addition to the process of the data analysis apparatus according to the third embodiment, the data analysis apparatus according to the modification of the third embodiment calculates, in regard to each of the causal elements, the similarity between two data elements of the parent elements, outputs the analysis result based on the calculated similarity, and, at the same time, can calculate the effect sizes in regard to the first data element and the parent elements and can output the effect sizes.

Therefore, the data analysis apparatus according to the modification of the third embodiment can obtain the same advantageous effects as in the modification of the second embodiment and the third embodiment.

Fourth Embodiment

The data analysis apparatus according to each of the above embodiments calculates the index values, based on the data elements, and extracts the parent elements, based on the calculated index values. On the other hand, a data analysis apparatus according to a fourth embodiment omits at least the calculation of index values, by acquiring information of parent elements (parent element information) from the outside (e.g. a storage device).

FIG. 13 is a block diagram exemplarily illustrating a configuration of the data analysis apparatus according to the fourth embodiment. A data analysis apparatus 1300 of FIG. 13 includes a data acquisition unit 1310, a parent element extraction unit 1330, an output controller 1340, a cause estimation unit 1360, and an effect size calculator 1370. Note that the data analysis apparatus 1300 can also be regarded as having such a configuration that the index value calculator 1020A and similarity calculator 1250 are excluded from the data analysis apparatus 1000A of FIG. 12. Thus, hereinafter, a description of a configuration overlapping the respective components of the data analysis apparatus 1000A is partly omitted. In addition, hereinafter, a description will be given of a case in which the number of causal elements estimated by the cause estimation unit 1360 is plural.

The data acquisition unit 1310 acquires the data element group and parent element information from the storage device 120. The parent element information is, for example, information relating to a parent element having a high association with an arbitrary data element. Specifically, the parent element information is a list of a parent-child relationship relating to an arbitrary data element. The data acquisition unit 1310 outputs the acquired data element group to the cause estimation unit 1360, the parent element extraction unit 1330 and the effect size calculator 1370, and outputs the acquired parent element information to the parent element extraction unit 1330.

The cause estimation unit 1360 acquires the data element group from the data acquisition unit 1310. The cause estimation unit 1360 estimates a plurality of causal elements that are causes of a change factor, by executing regression analysis with use of the specific data element and the data element group. The cause estimation unit 1360 outputs the estimated causal elements to the parent element extraction unit 1330.

The parent element extraction unit 1330 acquires the data element group and the parent element information from the data acquisition unit 1310, and acquires the causal elements from the cause estimation unit 1360. Based on the parent element information, the parent element extraction unit 1330 extracts, in regard to each of the causal elements, a parent element having a high association with the causal element from the data element group. The parent element extraction unit 1330 outputs the parent element corresponding to each causal element to the output controller 1340 and the effect size calculator 1370.

The effect size calculator 1370 acquires the data element group from the data acquisition unit 1310, and acquires the parent element corresponding to each causal element from the parent element extraction unit 1330. The effect size calculator 1370 calculates, in regard to each of the causal elements, effect sizes of the causal element and the parent element. The effect size calculator 1370 outputs the effect size calculated in regard to each causal element to the output controller 1340.

The output controller 1340 acquires the parent elements corresponding to the respective causal elements from the parent element extraction unit 1330, and acquires from the effect size calculator 1370 the effect size calculated in regard to each causal element. The output controller 1340 outputs the analysis result including information relating to the causal element and the parent element and information relating to the effect size, in regard to each of the causal elements.

Note that the data analysis apparatus 1300 may include a memory and a processor. The memory stores, for example, various programs (e.g. a data analysis program) relating to the operation of the data analysis apparatus 1300. The processor implements the functions of the data acquisition unit 1310, parent element extraction unit 1330, output controller 1340, cause estimation unit 1360 and effect size calculator 1370, by executing the various programs stored in the memory. Furthermore, the data analysis apparatus 1300 may include at least one of the output device 110 and the storage device 120.

The configuration of the data analysis apparatus 1300 according to the fourth embodiment has been described above. Next, an operation of the data analysis apparatus 1300 will be described with reference to a flowchart of FIG. 14.

FIG. 14 is a flowchart exemplarily illustrating an operation of the data analysis apparatus of FIG. 13. A process of the flowchart of FIG. 14 starts by the user executing a data analysis program.

(Step ST1410)

If the data analysis program is executed, the data acquisition unit 1310 acquires a data element group and parent element information. Specifically, the data acquisition unit 1310 acquires a data element group, which is composed of a plurality of data elements and relates to a change factor of a specific data element, and acquires parent element information relating to a parent element having a high association with an arbitrary data element.

(Step ST1420)

The cause estimation unit 1360 estimates causal elements that are causes of a change. Specifically, the cause estimation unit 1360 estimates causal elements that are causes of a change factor, by executing regression analysis by using the specific data element and the data element group.

(Step ST1430)

The parent element extraction unit 1330 extracts parent elements in regard to the causal elements. Specifically, based on the parent element information, the parent element extraction unit 1330 extracts, from the data element group, a parent element having a high association with the causal element in regard to each of the causal elements.

(Step ST1440)

The effect size calculator 1370 calculates effect sizes in regard to the causal element and each of the parent elements.

Specifically, the effect size calculator 1370 calculates effect sizes of the causal element and each of the parent elements, in regard to each of the causal elements.

(Step ST1450)

The output controller 1340 outputs an analysis result relating to the parent elements and the effect sizes. Specifically, in regard to each of the causal elements, the output controller 1340 outputs the analysis result including the information relating to the causal element and parent elements, and the information relating to the effect sizes. After step ST1450, the data analysis program ends.

As described above, the data analysis apparatus according to the fourth embodiment acquires the data element group that is composed of a plurality of data elements and that relates to a change factor of the specific data element, and the information of the parent element having a high association with each data element of the data element group; estimates a causal element that is a cause of the change factor, by executing regression analysis by using the specific data element and the data element group; extracts, based on the information of the parent element, a parent element having a high association with the causal element from the data element group; calculates an effect size on the change of the specific data element, in regard to the causal element and the corresponding to the parent element; and outputs the analysis result including the first information relating to the causal element and the corresponding parent element, and the second information relating to the effect size.

Therefore, since the data analysis apparatus according to the fourth embodiment requires neither the calculation process of the index value, nor the process for extracting the parent element, based on the index value, the processing time relating to the data analysis can be decreased.

FIG. 15 is a block diagram exemplarily illustrating a hardware configuration of a computer according to an embodiment. A computer 1500 includes, as hardware, a CPU (Central Processing Unit) 1510, a RAM (Random Access Memory) 1520, a program memory 1530, an auxiliary storage device 1540, and an input/output interface 1550. The CPU 1510 communicates, via a bus 1560, with the RAM 1520, program memory 1530, auxiliary storage device 1540, and input/output interface 1550.

The CPU 1510 is an example of a general-purpose processor. The RAM 1520 is used by the CPU 1510 as a working memory. The RAM 1520 includes a volatile memory such as an SDRAM (Synchronous Dynamic Random Access Memory). The program memory 1530 stores various programs including a data analysis program. As the program memory 1530, use is made of, for example, a ROM (Read-Only Memory), a part of the auxiliary storage device 1540, or a combination thereof. The auxiliary storage device 1540 nontemporarily stores data. The auxiliary storage device 1540 includes a nonvolatile memory such as an HDD or an SSD.

The input/output interface 1550 is an interface for a connection to another device. The input/output interface 1550 is used, for example, for a connection to the storage device 120 shown in FIG. 1, and for a connection to the output device 110.

Each of the programs stored in the program memory 1530 includes computer-executable instructions. When the program (computer-executable instructions) is loaded in the RAM 1520 and executed by the CPU 1510, the program causes the CPU 1510 to execute a predetermined process. For example, when the data analysis program is executed by the CPU 1510, the data analysis program causes the CPU

1510 to execute a series of processes described in the respective parts of the flowcharts of FIGS. 4, 8, 11 and 14.

The program may be provided to the computer 1500 in the state in which the program is stored in a computer-readable storage medium. In this case, the computer 1500 further includes a drive (not shown) that reads data from the storage medium, and acquires the program from the storage medium. Examples of the storage medium include a magnetic disk, an optical disc (CD-ROM, CD-R, DVD-ROM, DVD-R, or the like), a magneto-optical disc (MO, or the like), and a semiconductor memory. In addition, the program may be stored in a server on a communication network, and the computer 1500 may download the program from the server by using the input/output interface 1550.

The processes described in the embodiments may be executed not only by a general-purpose hardware processor such as the CPU 1510 executing the programs, but may also be executed by a purpose-specific hardware processor such as an ASIC (Application Specific Integrated Circuit). The term "processing circuit (processing unit)" includes at least one general-purpose hardware processor, at least one purpose-specific hardware processor, or a combination of at least one general-purpose hardware processor and at least one purpose-specific hardware processor. In the example of FIG. 15, the CPU 1510, RAM 1520 and program memory 1530 correspond to the processing circuit.

Thus, according to each of the above embodiments, overlooking of a factor, or the like, can be suppressed in the analysis of a change factor of observation data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data analysis apparatus comprising:

processing circuitry configured to:

acquire a data element group composed of a plurality of data elements;

calculate, in regard to a first data element in the data element group, an index value indicative of a conditional dispersion from another data element in the data element group;

extract, based on the index value, a parent element having a high association with the first data element from the data element group; and output an analysis result including first information relating to the first data element and the parent element, wherein the data element group relates to a change of a specific data element, the processing circuitry is further configured to estimate a causal element that is a cause of the change, by executing regression analysis by using the specific data element and the data element group, the first data element being the causal element, the processing circuitry is further configured to calculate an effect size on the change of the specific data element, in regard to the first data element and the parent element, the analysis result further including second information relating to the effect size, and the processing circuitry is further configured to change a display mode of the first information in accordance with a value of the effect size, the change of the display mode including at least one of:

(1) sorting a display order of the first data element and the parent element, (2) changing at least one of a character size, a thickness, and a character color of a character string that displays the first data element and the parent element, (3) changing the first information to graphical data including a tree structure, or (4) excluding, or rendering invisible, the parent element with the value of the effect size equal to or less than a predetermined threshold.

2. The data analysis apparatus according to claim 1, wherein the effect size is a scale parameter of a prior distribution model that is set for each of regression coefficients at a time when the first data element and the parent element are applied to a regression model.

3. The data analysis apparatus according to claim 2, wherein the processing circuitry is further configured to calculate the scale parameter in such a manner as to maximize a marginal likelihood of the prior distribution model.

4. The data analysis apparatus according to claim 1, wherein when a plurality of parent elements are extracted, the processing circuitry is further configured to:

calculate the index value indicative of a conditional dispersion between elements in regard to combinations of the parent elements; and extract a parent-child relationship between the parent elements, based on the index value, and the analysis result includes a hierarchical structure based on the first data element and the parent elements.

5. The data analysis apparatus according to claim 4, wherein the hierarchical structure is a tree structure in which the first data element is a root node, and the parent elements are internal nodes or leaf nodes.

6. The data analysis apparatus according to claim 1, wherein the processing circuitry is further configured to estimate the causal element by executing the regression analysis by using the specific data element as an objective variable and using each of data elements of the data element group, or a combination of the data elements, as an explanatory variable.

7. The data analysis apparatus according to claim 6, wherein the processing circuitry is further configured to:

estimate a combination of the causal elements by executing multiple regression analysis by using the combination of the data elements as the explanatory variable; and calculate, with respect to combinations of the causal elements, an effect size on the change of the specific data element in regard to each of combinations of arbitrary causal elements and a corresponding one of the parent elements.

8. The data analysis apparatus according to claim 1, wherein the processing circuitry is further configured to calculate the effect size by assuming that an expected value of an effect, which the first data element and the parent element have on the specific data element, to be zero.

9. The data analysis apparatus according to claim 1, wherein the processing circuitry is further configured to calculate a probability distribution of the effect size, the analysis result further including third information relating to the probability distribution.

10. The data analysis apparatus according to claim 1, wherein the index value is Goodman and Kruskal's tau.

11. The data analysis apparatus according to claim 1, wherein a number of levels of the first data element is greater than a number of levels of the parent element, and each level of the first data element and each level of the parent element have a relationship of a nest.

12. A data analysis apparatus comprising:

processing circuitry configured to:

acquire a data element group that is composed of a plurality of data elements and that relates to a change of a specific data element, and information of a parent element having a high association with each data element of the data element group;

estimate a causal element that is a cause of the change, by executing regression analysis by using the specific data element and the data element group;

extract, based on the information of the parent element, a parent element having a high association with the causal element from the data element group;

calculate an effect size on the change of the specific data element, in regard to the causal element and the parent element corresponding to the causal element; and output an analysis result including first information relating to the causal element and the corresponding parent element, and second information relating to the effect size, wherein the processing circuitry is further configured to calculate an effect size on the change of the specific data element, in regard to the causal element and the parent element, the analysis result further including second information relating to the effect size, the processing circuitry is further configured to change a display mode of the first information in accordance with a value of the effect size, the change of the display mode including at least one of:

(1) sorting a display order of a first data element and the parent element, (2) changing at least one of a character size, a thickness, and a character color of a character string that displays the first data element and the parent element, (3) changing the first information to graphical data including a tree structure, or (4) excluding, or rendering invisible, the parent element with the value of the effect size equal to or less than a predetermined threshold.

13. A data analysis method comprising:

acquiring a data element group composed of a plurality of data elements;

calculating, in regard to a first data element in the data element group, an index value indicative of a conditional dispersion from another data element in the data element group;

extracting, based on the index value, a parent element having a high association with the first data element from the data element group; and outputting an analysis result including first information relating to the first data element and the parent element, wherein the data element group relates to a change of a specific data element, and the method further comprises:

estimating a causal element that is a cause of the change, by executing regression analysis by using the specific data element and the data element group, the first data element being the causal element, calculating an effect size on the change of the specific data element, in regard to the first data element and the parent element, the analysis result further including second information relating to the effect size, and changing a display mode of the first information in accordance with a value of the effect size, the changing of the display mode including at least one of:

(1) sorting a display order of the first data element and the parent element, (2) changing at least one of a character size, a thickness, and a character color of a character string that displays the first data element and the parent element, (3) changing the first information to graphical data including a tree structure, or (4) excluding, or rendering invisible, the parent element with the value of the effect size equal to or less than a predetermined threshold.

14. A data analysis apparatus comprising:

processing circuitry configured to:

acquire a data element group composed of a plurality of data elements;

calculate, in regard to a first data element in the data element group, an index value indicative of a conditional dispersion from another data element in the data element group;

extract, based on the index value, a parent element having a high association with the first data element from the data element group; and output an analysis result including first information relating to the first data element and the parent element, wherein the data element group relates to a change of a specific data element, the processing circuitry is further configured to estimate a causal element that is a cause of the change, by executing regression analysis by using the specific data element and the data element group, the first data element being the causal element, and the processing circuitry is further configured to calculate an effect size on the change of the specific data element, in regard to the first data element and the parent element, the analysis result further including second information relating to the effect size, the analysis result being:

data in which the parent element in regard to the first data element is enumerated, and data of the effect size in regard to the first data element and the parent element.

* * * * *